United States Patent [19]
Takiguchi et al.

[11] Patent Number: 5,873,749
[45] Date of Patent: Feb. 23, 1999

[54] STRUCTURE AND METHOD FOR MOUNTING ELECTRIC EQUIPMENT UNIT

[75] Inventors: Shuji Takiguchi; Atsuyoshi Yamaguchi; Keizo Nishitani, all of Shizuoka, Japan

[73] Assignee: Yazaki Corporation, Tokyo, Japan

[21] Appl. No.: 774,371

[22] Filed: Dec. 27, 1996

[30] Foreign Application Priority Data

Dec. 28, 1995 [JP] Japan .................................. 7-343972
Feb. 20, 1996 [JP] Japan .................................. 8-032429

[51] Int. Cl.⁶ .................................................. H01R 13/73
[52] U.S. Cl. ........................... 439/534; 439/34; 174/72 A
[58] Field of Search ................... 439/34, 534; 174/72 A; 296/70; 180/90

[56] References Cited

U.S. PATENT DOCUMENTS

| | | | |
|---|---|---|---|
| 5,324,203 | 6/1994 | Sano et al. | 439/34 |
| 5,353,190 | 10/1994 | Nakayama et al. | 439/34 |
| 5,675,316 | 10/1997 | Nishitani et al. | 439/34 |
| 5,676,552 | 10/1997 | Fukuda et al. | 439/34 |
| 5,709,358 | 1/1998 | Kubota | 439/34 |

FOREIGN PATENT DOCUMENTS

| | | |
|---|---|---|
| 2936468 C2 | 9/1984 | Germany . |
| 3513048 C2 | 3/1988 | Germany . |
| 3743648 A1 | 7/1988 | Germany . |
| 4212889 A2 | 10/1993 | Germany . |
| 19502387 A1 | 8/1995 | Germany . |
| 7-83536 | 9/1995 | Japan . |
| 8-2290 | 1/1996 | Japan . |

Primary Examiner—Gary F. Paumen
Attorney, Agent, or Firm—Armstrong, Westerman, Hattori, McLeland & Naughton

[57] ABSTRACT

An electric equipment unit is mounted to a mount opening as in an instrument panel. The unit has on top a panel-connecting means electrically connected with its internal circuit, and on opposite left and right sides at an upper portion thereof clamps and at a lower portion thereof support shaft means. The mount opening has on its upper inner surface a unit-connecting means, on opposite left and right inner surfaces at an upper portion thereof fixing holes and at a lower portion thereof shaft-receiving means. The unit is rotated and mounted to the mount opening, with its support shaft means engaged in the mount opening shaft-receiving means, so that the clamps fit in the fixing holes, while at the same time the panel-connecting means is contacted and electrically connected with the unit-connecting means. The mountability of an electric equipment unit to a structure such as an instrument panel is so improved as to enable easy blind operation, while making it possible to attain the mounting and the electric connection at one time.

15 Claims, 26 Drawing Sheets

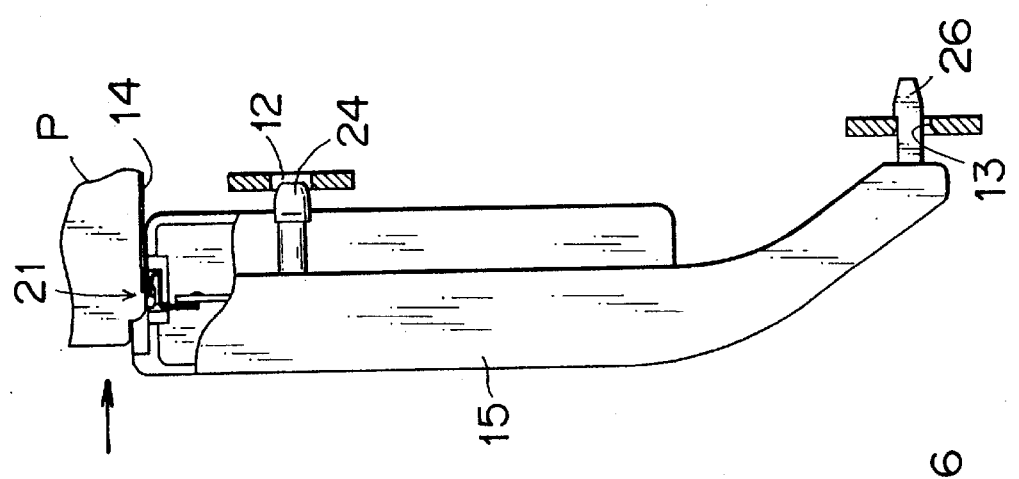
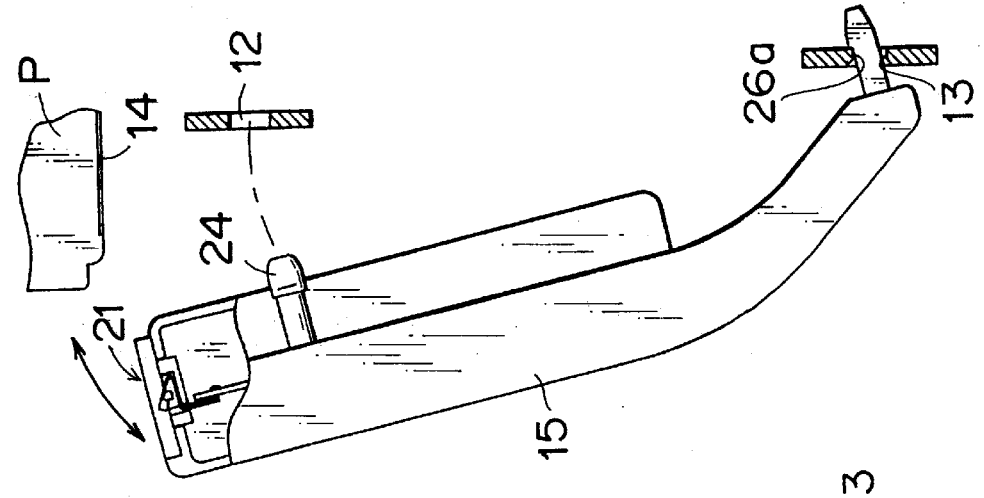
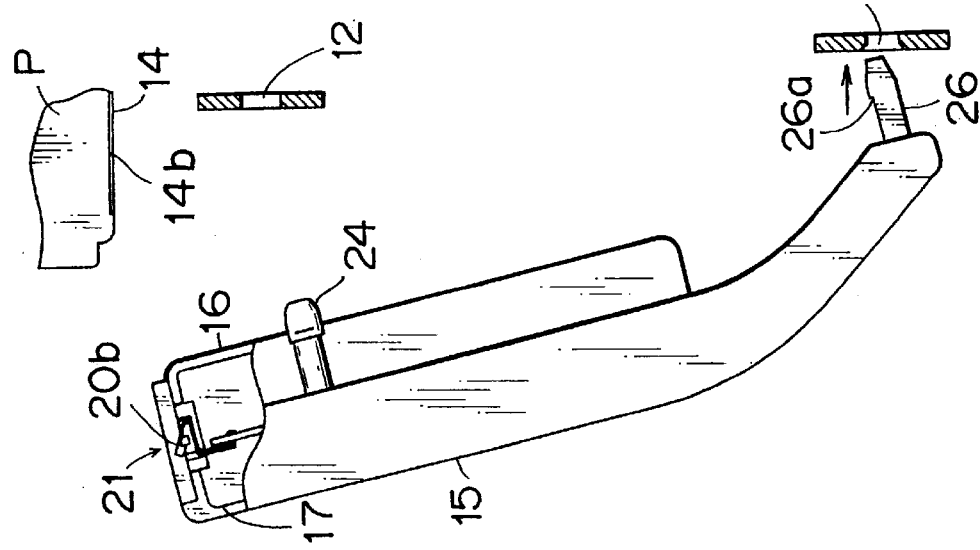

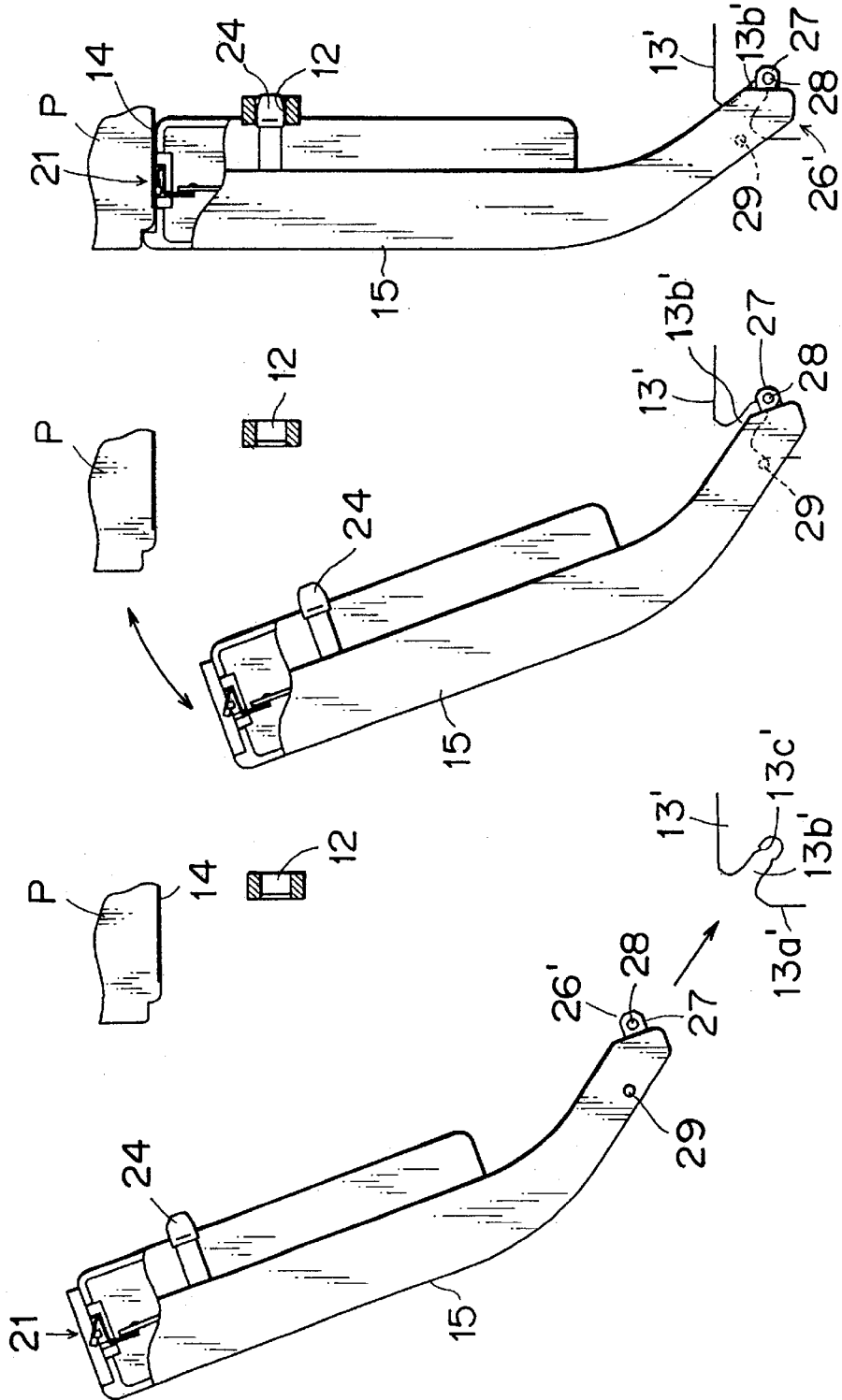

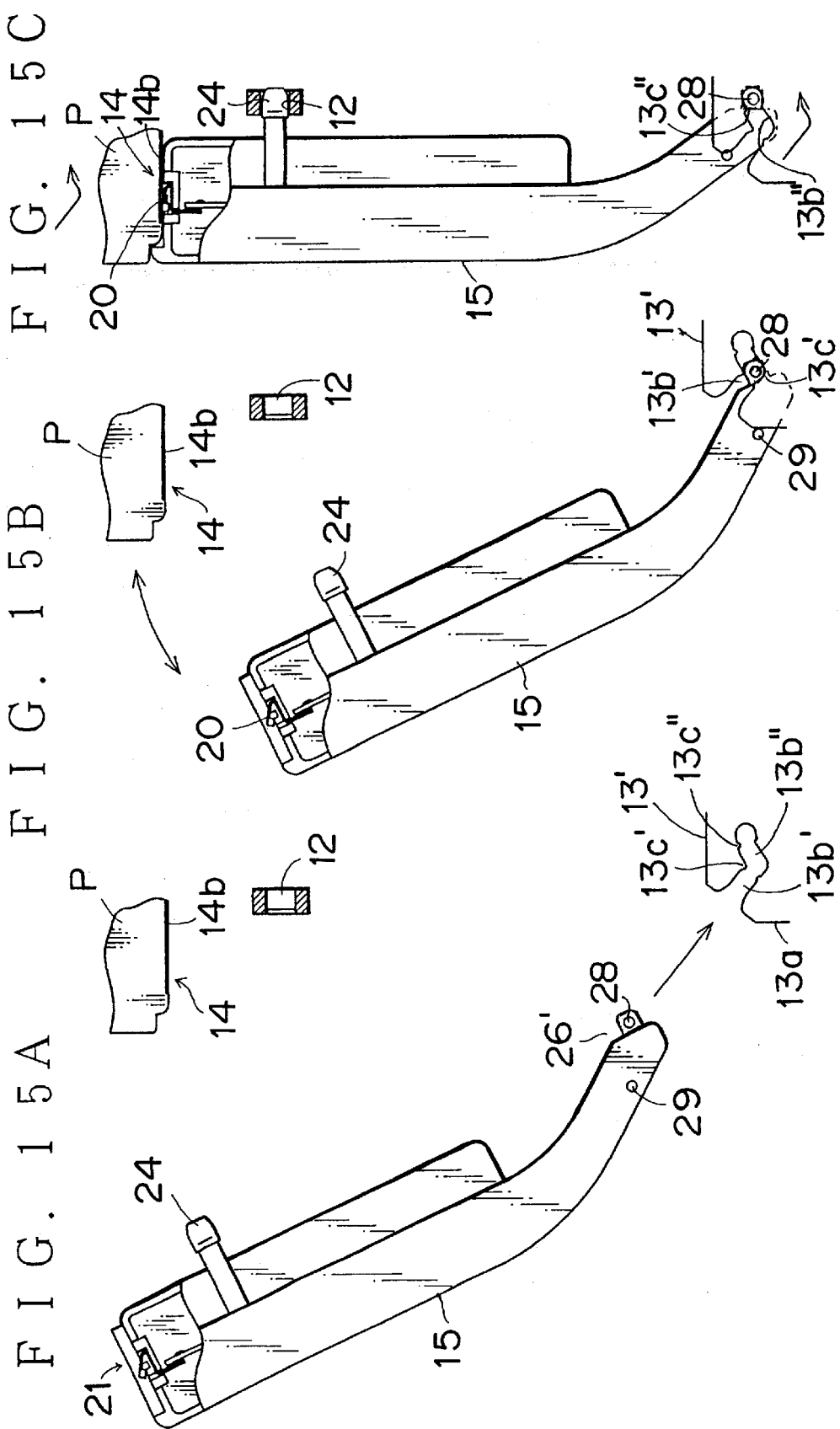

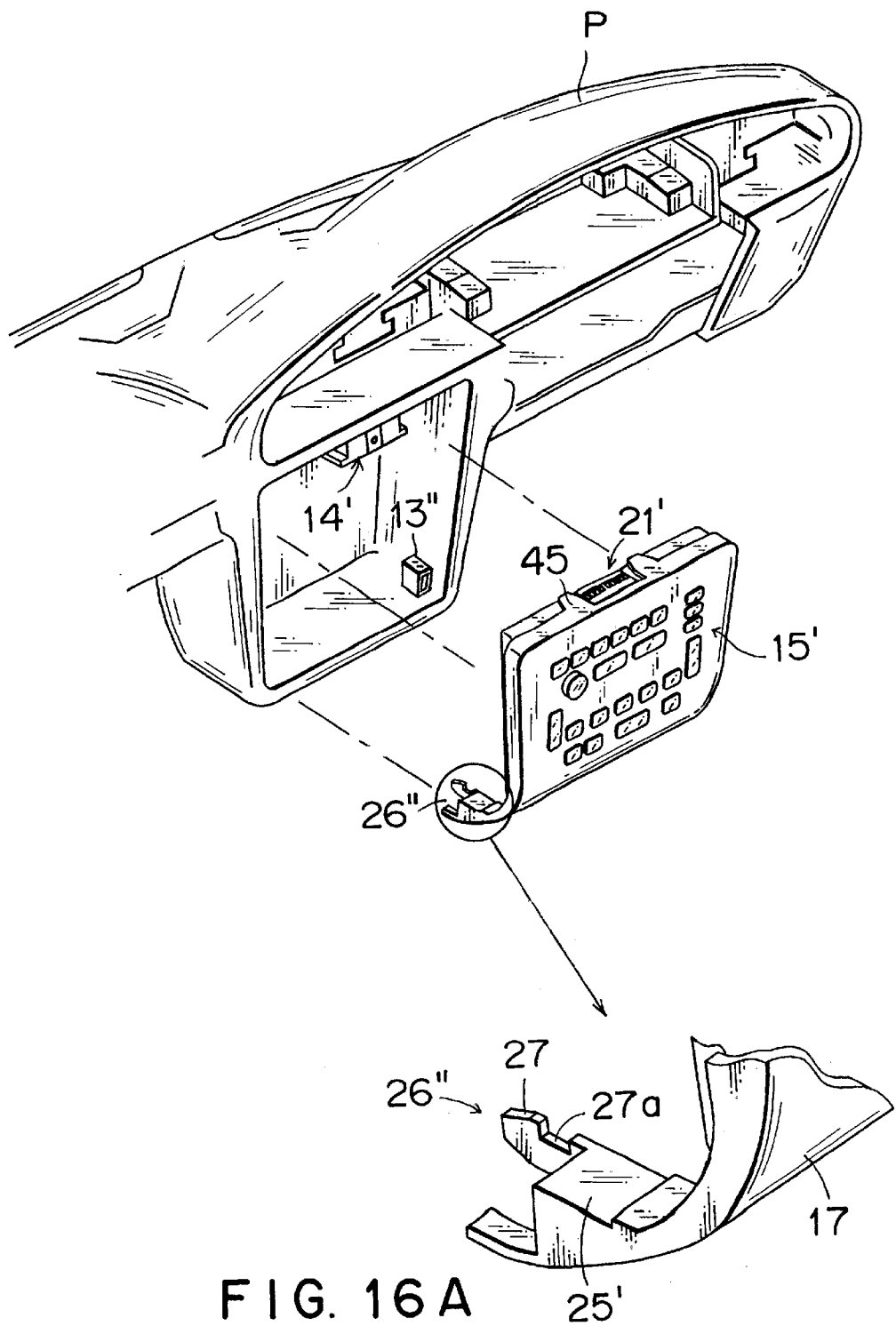

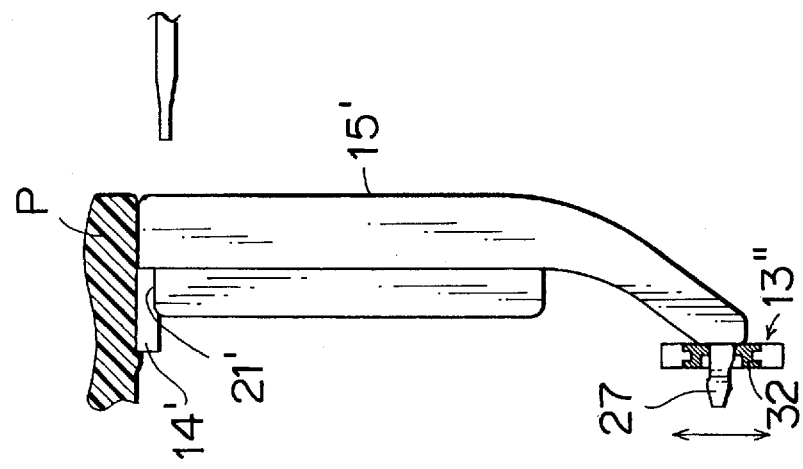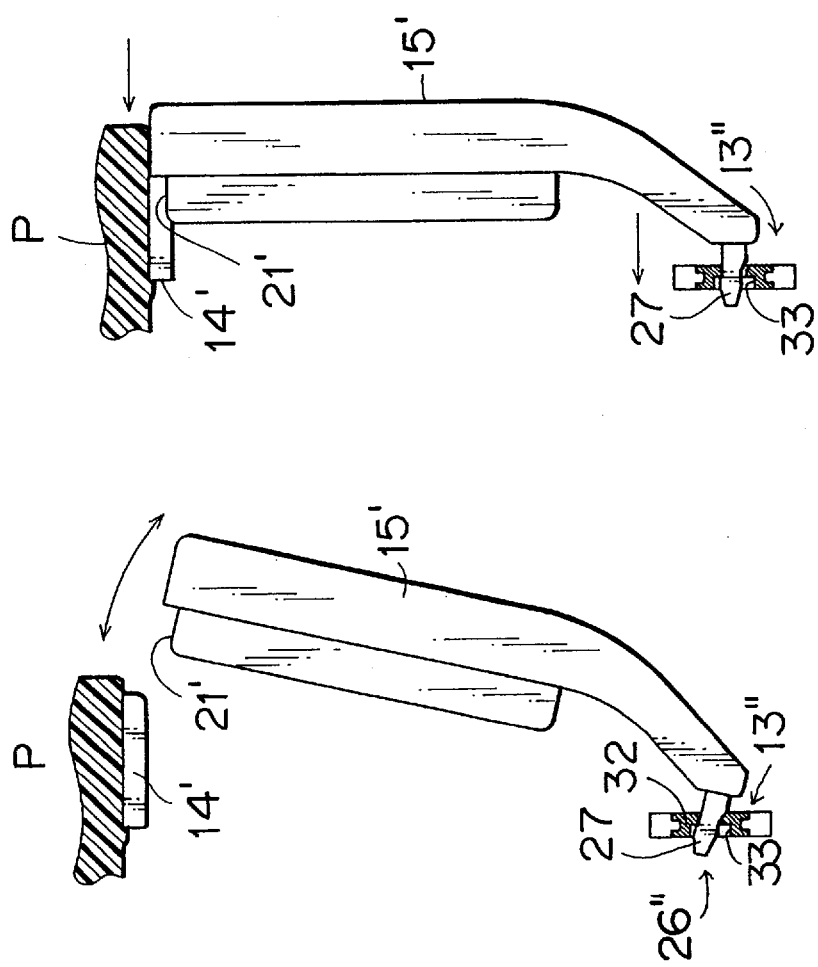

STRUCTURE AND METHOD FOR MOUNTING ELECTRIC EQUIPMENT UNIT

BACKGROUND OF THE INVENTION

1. Field of the Invention

This invention relates to a structure and method for mounting an electric equipment unit such as, for example, mounting a center cluster module to the instrument panel of a vehicle.

2. Description of the Related Art

A large number of electric components such as various meters, switches and the like are gathered in and around, for example, the instrument panel of an automobile. As a result, their mounting is uneasy. Further, due to the resulting many branches of wiring harnesses and their connecting connectors, it has been difficult to automate the production of wiring harnesses.

As a countermeasure to the above problems, the Applicant has proposed a center console module as shown in FIG. 37 (Japanese Patent Application No. 6-143117).

The center console module 1 is formed separately from the instrument panel P. This module 1 comprises a center console panel 2, a plurality of electric components 3 (3a, 3b, 3c, 3d) mounted on the console panel 2, and a module wiring harness 5 (5a, 5b) contained inside the console panel 2, the wiring harness having at one end movable multipolar connectors 7, 7' and at an intermediate portion a plurality of connectors 8 connected to the corresponding electric components 3. The center console module 1 is mounted in the central mount opening 9, followed by coupling the movable multipolar connectors 7, 7' to a collective connector 10 so that the console module 1 is connected to an instrument wiring harness W or a not-shown cowl wiring harness. In this figure, denoted 4 is an electronic control unit for controlling the plurality of electric components 3, and 6 a finish panel.

The center console module 1 has a center cluster in the instrument panel P integrally incorporated therein, but depending on the type and grade of an automobile, a structure is still being used in which a center cluster and a console box are separated from each other. A center cluster, however, is conventionally installed by separately moving its many components such as a cluster case, internal circuit board, finish panel and the like in parallel to the mount opening in the instrument panel, resulting in a low operability. In particular, since fixing members such as fixing clamps and their shafts-receiving holes get out of sight during the installation operation, difficulty has been encountered in the blind operation.

SUMMARY OF THE INVENTION

This invention has been accomplished to overcome the above drawbacks and an object of this invention is to provide a structure and method for mounting an electric equipment unit, which improves the mountability of the unit, and which attains electric connection at the same time when the unit is mounted.

In order to attain the object, according to an aspect of this invention, there is provided a structure for mounting an electric equipment unit to a mount opening as in a vehicle instrument panel, which comprises: unit-connecting means and fixing means for the unit, each provided at a respective upper portion inside the mount opening, and shaft-receiving means provided at a lower portion inside the mount opening; panel-connecting means and fixed means corresponding to the fixing means, each provided at a respective upper portion of the unit, the panel-connecting means being electrically connected to an internal circuit of the unit, and support shaft means provided at a lower portion of the unit, wherein the shaft-receiving means and the support shaft means are engaged with each other such that the unit is rotatably supported at the lower portion, and wherein when the fixing means and the fixed means are engaged with each other, the unit is as a whole fixed to the mount opening while at the same time causing the unit-connecting means and the panel-connecting means to be electrically connected with each other.

In the above construction according to this invention, the electric equipment unit has support shaft means serving as a fulcrum for rotationally mounting the unit and simultaneously making electric connection, resulting in an improved operability and an easy blind mounting operation.

Further, it suffices to mount the electric equipment unit to a mount opening in a structure such as an instrument panel, and its mounting operation can be done without being interfered and bothered by a shift lever, console box and the like.

Advantageously, the electric equipment unit comprises a rear case containing a circuit board constituting the internal circuit, and a finish panel fitted thereover, and the panel-connecting means is provided on an upper wall of the rear case. Further, the panel-connecting means comprises a surface contact terminal connected at one end to the internal circuit and having at the other end an inclined resilient contact piece raised from the rear case side towards the finish panel.

Preferably, the panel-connecting means is provided at a central portion of the upper wall of the rear case. Preferably, the unit-connecting means is provided on an upper inner wall surface of the mount opening and comprises a connector of a card edge type having a connection terminal for surface-to-surface contact with the inclined resilient contact piece of the surface contact terminal.

Preferably, the unit support shaft means comprises support legs extending at opposite left and right sides at the lower portion of the unit, each support leg having a recess, and the mount opening shaft-receiving means comprises shaft-receiving holes for receipt therein of the support legs, and wherein edges of the shaft-receiving holes and the recesses of the support legs are engaged with each other to preliminarily lock the unit to the mount opening in an inclined position opened upwardly relative to the mount opening. It is also preferred that the mount opening shaft-receiving means comprises frame bodies integrally formed on opposite inner wall surfaces of the mount opening, mouthpieces disposed inside the frame bodies, each having a slit for receipt therein of a respective one of the support legs, and elastic members provided circumferentially around the mouthpieces to support the same to the frame bodies. Preferably, the slits each comprises a front longer slit and a rear shorter slit continuous to each other, the former for guiding the insertion therein of the support legs and the latter for engaging the support legs.

Preferably, the support shaft means comprises support legs extending at opposite left and right sides at the lower portion of the unit, support shaft projections provided on side surfaces of the respective support legs at their front end, and stop pins provided on the side surfaces at a certain distance from the support shaft projections, the projections and the stop pins extending in the same direction perpendicular to the respective support legs, and the shaft-receiving means comprises shaft-receiving bosses each having a shaft-receiving groove for a respective one of the support shaft projections, and wherein when the support shaft projections of the support legs are inserted into the shaft-receiving grooves, the stop pins engage with end surfaces of the shaft-receiving bosses such that the unit is preliminarily locked to the mount opening in an inclined position opened upwardly relative to the mount opening.

Preferably, the shaft-receiving bosses each further has a locking projection provided on at least one of opposite inner surfaces of a respective one of the shaft-receiving grooves for locking the support shaft projection.

Preferably, the fixed means of the unit comprises clamps provided at opposite left and right sides at the upper portion thereof, and the fixing means of the mount opening comprises brackets each having a fixing hole for engagement therein of a respective one of the clamps.

Preferably, the fixed means of the unit comprises a bolt insertion hole provided at a center of an upper edge portion of the finish panel, and the fixing means comprises a fixing boss provided projecting on an upper inner wall of the mount opening, the boss having a screw hole into which a bolt is threaded through the bolt insertion hole.

Preferably, the fixed means of the unit comprises a pair of clamps so projecting from a central portion of an upper wall of the finish panel as to bound both sides of the panel-connecting means, and the fixing means comprises brackets depending from an upper inner wall of the mount opening, each having a fixing hole for engagement therein of a respective one of the pair of clamps.

According to another aspect of this invention, there is provided a method of mounting an electric equipment unit to a mount opening provided as in a vehicle instrument panel, which unit has at respective upper portions thereof panel-connecting means electrically connected to an internal circuit of the unit and fixed means, and at a lower portion thereof support shaft means, comprising: providing in advance at respective upper portions inside the mount opening unit-connecting means and fixing means for the unit, and at a lower portion inside the mount opening shaft-receiving means; engaging the support shaft means at the lower portion of the unit in the shaft-receiving means of the mount opening to have the unit preliminarily locked to the mount opening in an inclined position opened upwardly relative to the mount opening; and rotating the unit to the mount opening side to bring an upper surface thereof into opposition in substantially parallel to an upper inner wall surface of the mount opening, and the fixed means into engagement with the fixing means such that the unit is fixed to the mount opening while at the same time the panel-connecting means is contacted and electrically connected with the unit-connecting means.

According to the method as mentioned above, from its position preliminarily locked to the mount opening, the electric equipment unit is rotated to bring its upper surface into opposition in substantially parallel to the upper inner wall surface of the mount opening, and thus the panel-connecting means and the unit-connecting means into opposition in parallel to each other. As a result, an undue force is prevented from being applied to connection terminals such as the surface contact terminals and a stable electric connection is attained.

The above and other objects, features and advantages of this invention will become apparent from the following description and the appended claims, taken in conjunction with the accompanying drawings in which like parts or elements are denoted by like reference characters.

BRIEF DESCRIPTION OF THE DRAWINGS

FIGS. 8A to 8C are explanatory views of the process of mounting the electric equipment unit to the instrument panel;

FIGS. 13A to 13C are explanatory views of the process of mounting the electric equipment unit of FIG. 9 to the instrument panel;

FIGS. 15A to 15C are explanatory views of the process of mounting the electric equipment unit of FIG. 14 to the instument panel;

FIG. 16 is a perspective view of a structure for mounting an electric equipment unit to the instrument panel according to a yet another embodiment of this invention, with the unit shown separated;

FIGS. 25A to 25C are explanatory views of the process of mounting the electric equipment unit of FIG. 16 to the instrument panel;

DESCRIPTION OF THE PREFERRED EMBODIMENTS

Embodiments of this invention will now be described with reference to the attached drawings.

Figure 1:
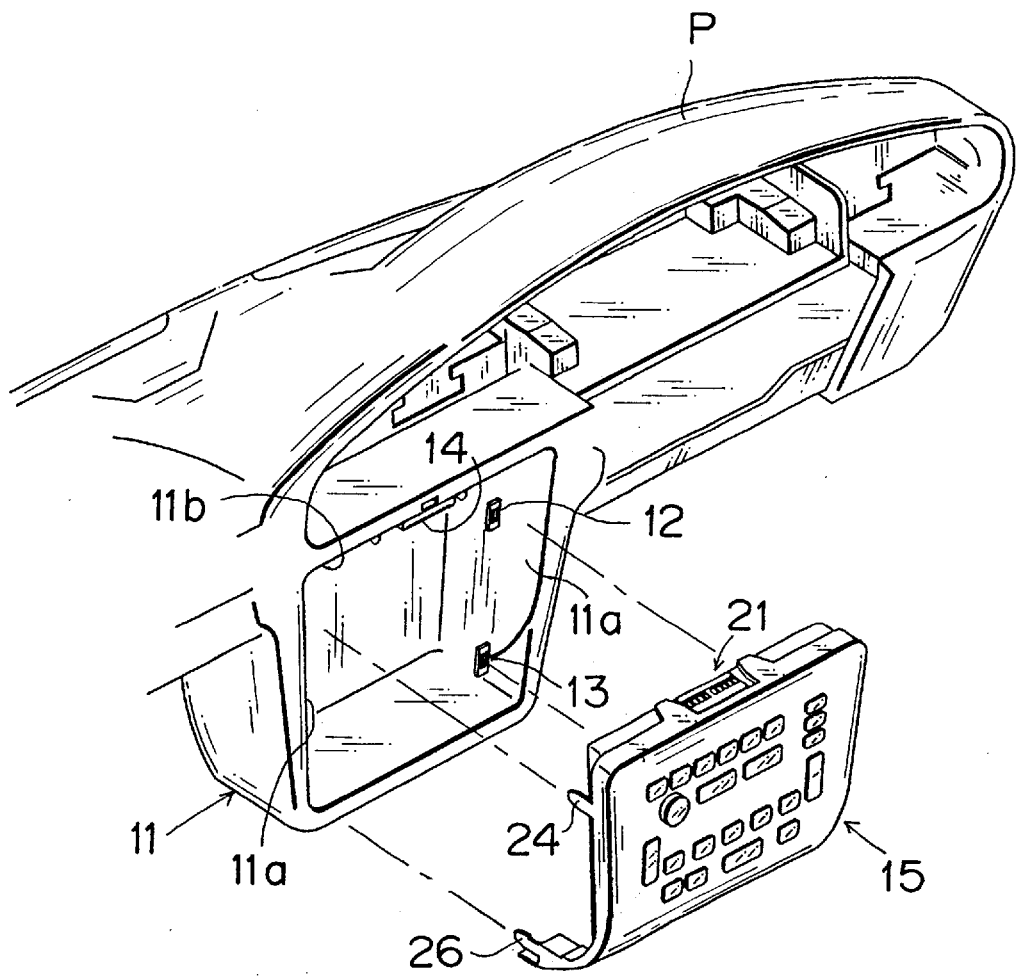
FIG. 1 is a perspective view of a structure for mounting an electric equipment unit to the instrument panel according to this invention, with the unit shown separated.

In FIG. 1, an instrument panel P is at a center thereof provided with a mount opening 11 for an electric equipment unit 15. The mount opening 11 has on opposite left and right inner walls 11a at an upper portion thereof fixing holes 12 and at a lower portion thereof shaft-receiving portions 13, and on an upper inner wall 11b a unit-connecting portion 14.

Figure 7:
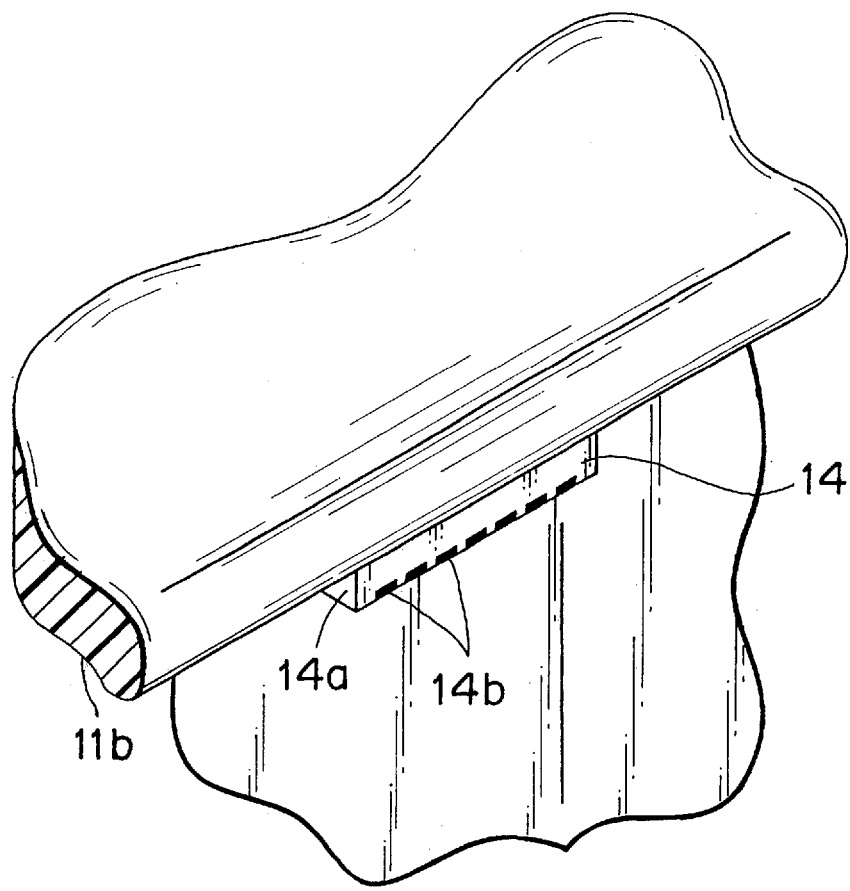
FIG. 7 is a partial perspective view showing a unit-connecting portion of the instrument panel of FIG. 1.
Figure 9:
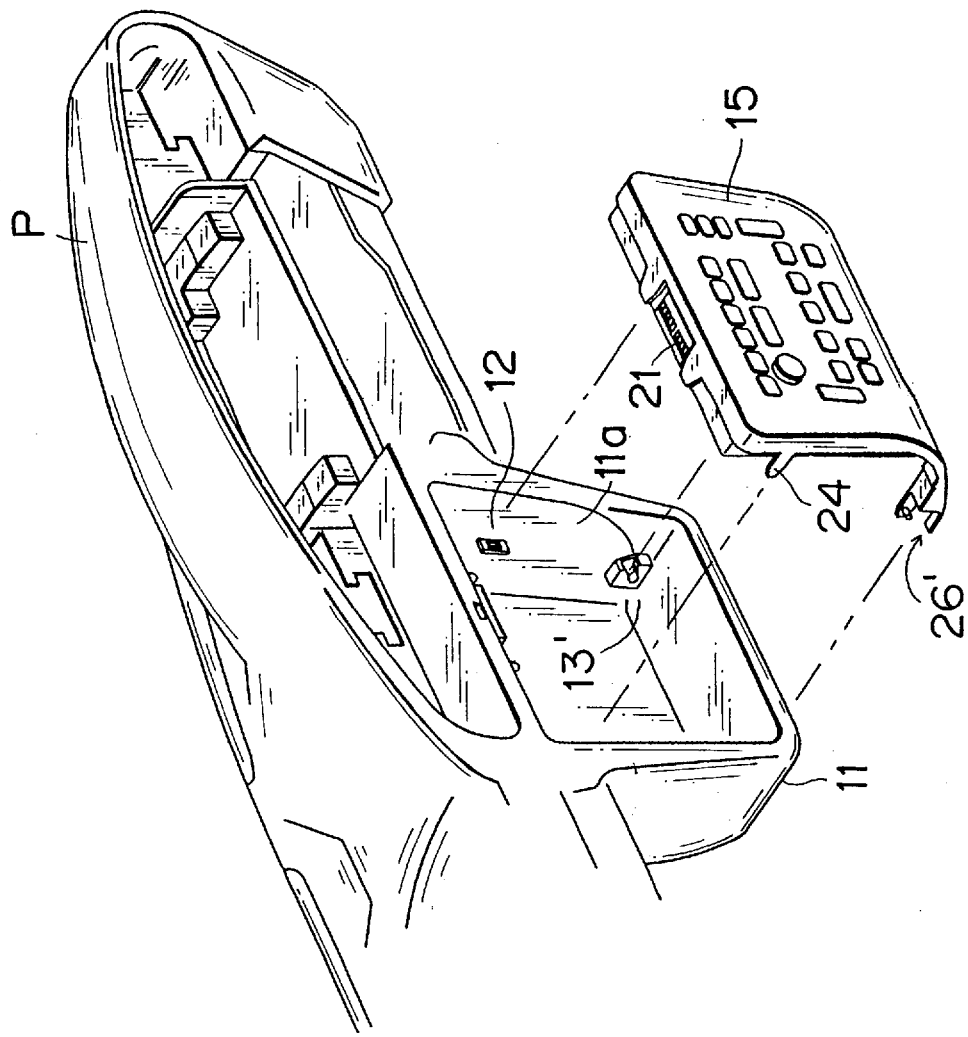
FIG. 9 is a perspective view of a structure for mounting an electric equipment unit to the instrument panel according to another embodiment of this invention, with the unit shown separated.
Figure 10:
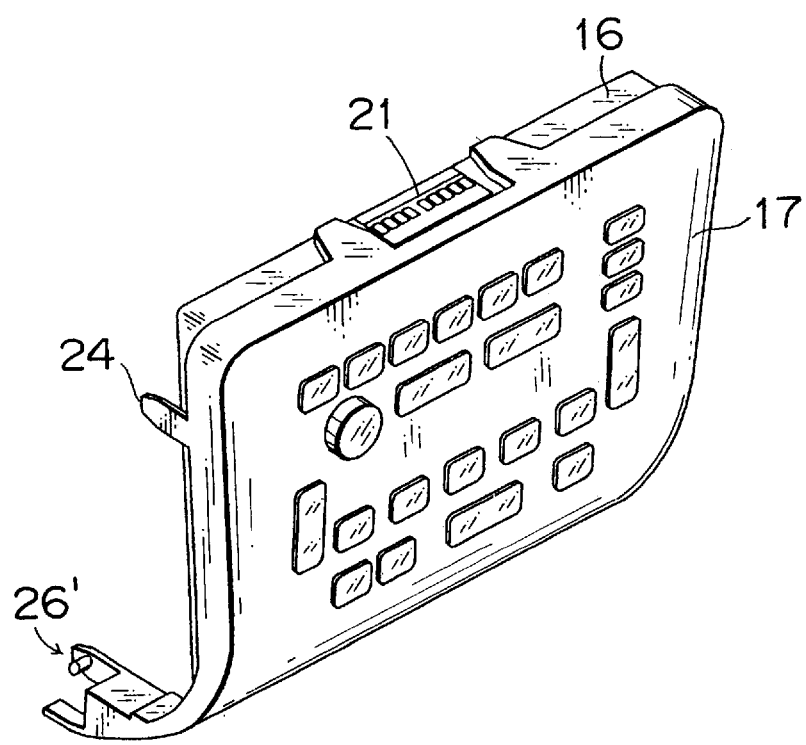
FIG. 10 is an enlarged perspective view of the electric equipment unit of FIG. 9.
Figure 11:
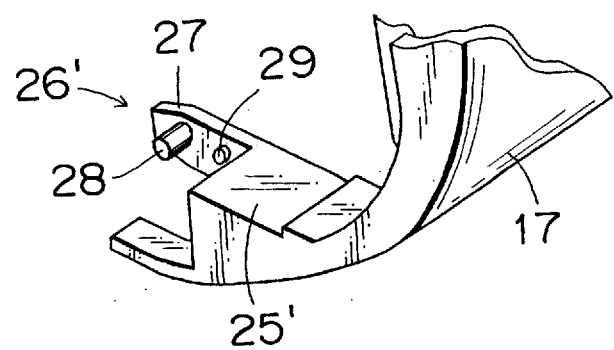
FIG. 11 is a partial enlarged perspective view of a support shaft portion of the unit of FIG. 9.

The shaft-receiving portions 13 are provided in the form of shaft-receiving holes for later-described support legs 26 (see FIG. 5). The unit-connecting portion 14, as shown in FIG. 7, comprises a connector of a so-called card edge type sticked on the upper inner wall 11b, the connector having an insulator base 14a and connection terminals 14b exposed in a row on the insulator base.

Figure 2:
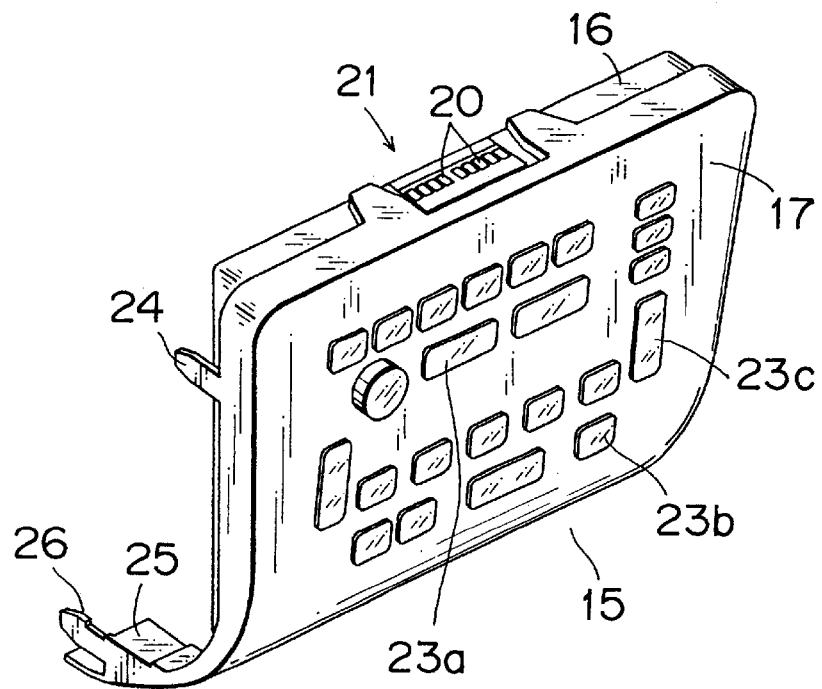
FIG. 2 is an enlarged perspective view of the electric equipment unit of FIG. 1.
Figure 3:
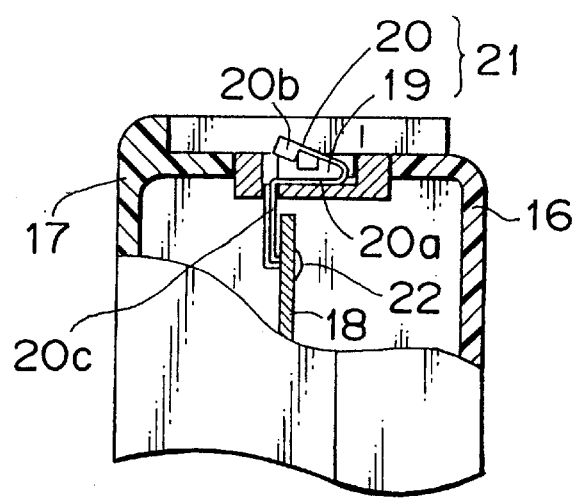
FIG. 3 is a partial longitudinal sectional view of the electric equipment unit of FIG. 2.

The electric equipment unit 15 is constructed as a center cluster module in the example illustrated. The electric equipment unit 15, as shown in FIGS. 2 and 3, comprises a rear case 16 of synthetic resin and a finish panel 17 fitted over the rear case. The rear case 16 has accommodated therein a printed circuit board 18 implemented with a functional circuit for controlling not-shown electric equipment such as a CRT, radio/stereo, air conditioner and the like. From a viewpoint of mechanical strength, the finish panel 17 is preferably formed of a metal plate embossed, resin-treated or otherwise treated.

On top of the electric equipment unit 15 is provided a panel-connecting portion 21. In other words, a plurality of surface contact terminals 20 are arranged in a row in a recess 19 provided on an upper wall of the rear case 16 to form the panel-connecting portion 21 which corresponds to the unit-connecting portion 14 inside the mount opening 11.

Each surface contact terminal 20 comprises a base plate 20a, an inclined resilient contact piece 20b at one end of the base plate on the side of the rear case 16, which is raised towards the finish panel 17, and a connecting piece 20c at the other end of the base plate, which extends downwardly in the form of L to be connected to a circuit (not shown) of the above-mentioned printed circuit board 18 via a solder 22. The finish panel 17 is at its front provided with many switches 23a, 23b, 23c . . . for the not-shown electric equipment.

Figure 5:
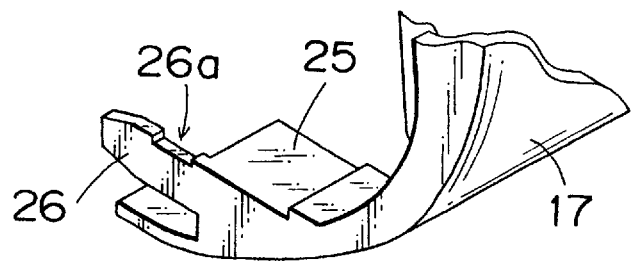
FIG. 5 is a partial enlarged perspective view showing a support shaft portion of the unit of FIG. 2.

The electric equipment unit 15 has, on opposite left and right sides at an upper portion thereof, i.e., on opposite sides of the finish panel 17, clamps 24 which project towards the side of the rear case 16, and at the lower end support shaft portions or support legs 26 projecting in the mounting direction of the unit 15 to the mount opening as best shown in FIG. 5. The support legs 26 are reinforced by and provided at outer sides of reinforcement members 25 which extend in the same direction as the support legs 26. Each support leg 26 has a recess 26a on its top surface.

Figure 6A:
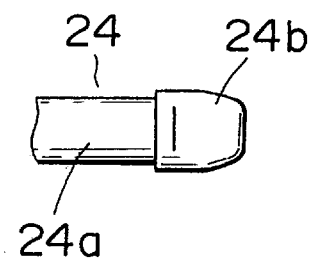
FIGS. 6A and 6B are respectively explanatory views of clamp portions of the electric equipment unit of FIG. 2.
Figure 6B:
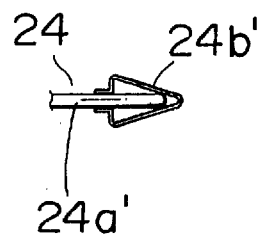

Each clamp 24, as shown in FIG. 6A, comprises a shaft 24a and a head 24b at the front end of the shaft, the latter having a diameter larger than that of the former and a rounded tip. It is also possible, however, to employ a clamp comprising, as shown in FIG. 6B, a shaft 24a' and a head 24b' in the form of an arrowhead.

The mounting of the electric equipment unit 15 to the instrument panel P will now be described with reference to FIGS. 8A to 8C.

First, as shown in FIGS. 8A and 8B, the support legs 26 at the lower end of the electric equipment unit 15 are inserted into the shaft-receiving holes 13 inside the mount opening 11. If in this state an operator puts his hands off the unit 15, the unit rotates or inclines by its own weight in a parting direction from the mount opening 11 as indicated by an arrow, at which the notches 26a engage edges of the shaft-receiving holes 13 to stop the unit rotation. The unit 15 is thus preliminarily locked to the instrument panel P in an inclined position opened upwardly relative to the instrument panel.

The electric equipment unit 15 is then pushed at an upper portion thereof towards the mount opening 11 as shown in FIG. 8C to bring its top surface into opposition in parallel to the surface of the upper inner wall 11b of the mount opening 11, so that the panel-connecting portion 21 and the unit-connecting portion 14 are also opposed in parallel to each other, and the clamps 24 are fitted in the fixing holes 12 to lock the unit 15.

Concurrently with this locking, the inclined resilient contact pieces 20b of the surface contact terminals 20 on top of the unit 15 contact the respective connection terminals 14b of the above-mentioned card edge type connector to electrically connect the unit-connecting portion 14 and the panel-connecting portion 21. In this instance, since the panel-connecting portion 21 and the unit-connecting portion 14 are opposed in parallel to each other as mentioned above, an undue force is prevented from being applied to the inclined resilient contact pieces 20b of the surface contact terminals 20 and/or the connection terminals 14b, resulting in a stable electric connection.

As described above, the mounting of the electric equipment unit 15 to the instrument panel P can be easily effected by preliminarily locking the unit through the engagement of the downwardly located support legs (support shaft portions) 26 in the shaft-receiving holes (shaft-receiving portions) 13, and the subsequent foward pushing at an upper portion of the unit 15 to have the clamps 24 engaged in the fixing holes 12.

The engagement of the support legs 26 in the shaft-receiving holes 13 only requires the positioning of the support legs from outside the mount opening 11, resulting in the blind operation facilitated and the operability greatly improved.

Further, the electric connection between the unit-connecting portion 14 and the panel-connecting portion 21 can be easily and reliably made with the aid of the card edge type connector and the surface contact terminals 20 adopted.

FIGS. 9 to 12 show the shaft-receiving portions and the support shaft portions according to another embodiment of this invention.

In these figures, the support shaft portions 26' at the lower end of the electric equipment unit 15 each comprises a support leg 27 which projects at the inner side of a reinforcement portion 25' in the mounting direction of the unit 15 to the instrument panel P, a support shaft projection 28 provided projecting outwardly on a side surface of the support leg 27 near its front end, and a stop pin 29 provided on the support leg side surface at a certain distance from the support shaft projection 28 towards the base of the support leg 27 and projecting in the same direction as the projection 28.

The shaft-receiving portions 13', on the other hand, each comprises a shaft-receiving boss 13a' provided projecting on respective left and right inner walls 11a of the mount opening 11, the boss having a shaft-receiving groove 13b' for receipt therein of the related support shaft projection 28 as mentioned above. The shaft-receiving groove 13b' is inclined downwardly from the open end at its inlet to the innermost part, and there are provided small locking projections 13c' on opposite walls at a position near the innermost part. The width of the open end of the shaft-receiving groove 13b' is preferably set sufficiently larger than the diameter of the support shaft projection 28.

FIGS. 13A to 13C show the mounting process of the electric equipment unit 15 with such support shaft portions 26'.

In other words, as shown in FIGS. 13A and 13B, the support shaft projections 28 projecting from the support legs 27 of the support shaft portions 26' are slidingly pushed into the respective shaft-receiving grooves 13b' until each support shaft projection 28 rides over the opposed locking projections 13c' and is locked in place in the innermost part of the related groove 13b'.

If in this state an operator puts his hands off the electric equipment unit 15, the unit inclines by its own weight in a parting direction from the mount opening 11 as indicated by an arrow, followed by the abutment of the stop pins 29 against front end surfaces of the shaft-receiving bosses 13a' to stop the unit rotation. The electric equipment unit 15 is thus preliminarily locked to the instrument panel P in an inclined position opened upwardly relative to the instrument panel P.

The electric equipment unit 15 is then pushed at an upper portion thereof towards the mount opening 11 as shown in FIG. 8C to bring the clamps 24 into engagement in the fixing holes 12 to lock the unit 15 in the same manner as previously described.

FIGS. 14A, 14B and FIGS. 15A to 15C show a modified example of the shaft-receiving groove of the boss 13a' according to this invention.

Figure 12A:
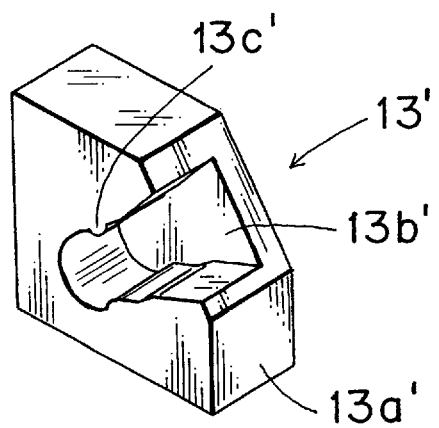
FIGS. 12A and 12B are respectively perspective and sectional views of a shaft-receiving portion of the unit of FIG. 9.
Figure 12B:
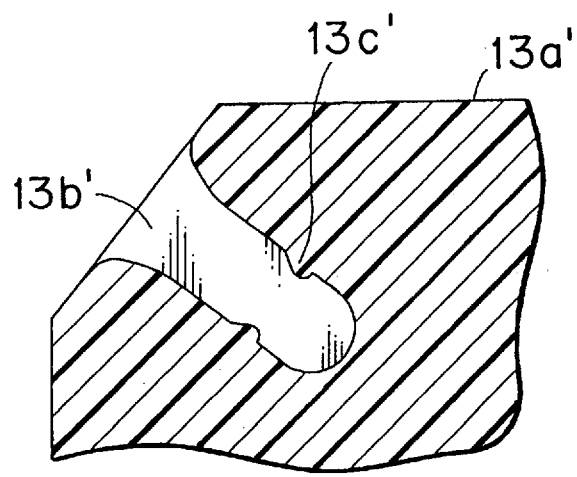
Figure 14A:
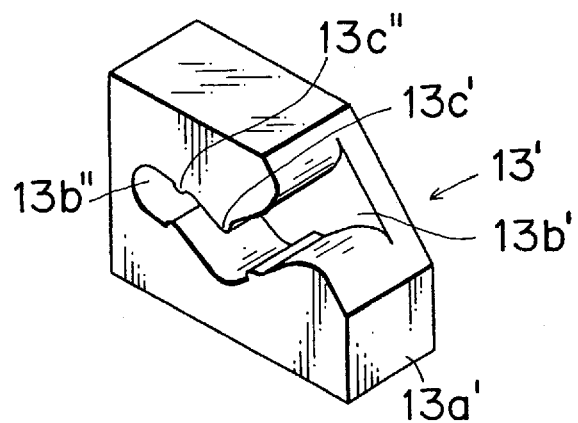
FIGS. 14A and 14B are respectively perspective and sectional views of a modified example of the shaft-receiving portion of the unit of FIG. 9.
Figure 14B:
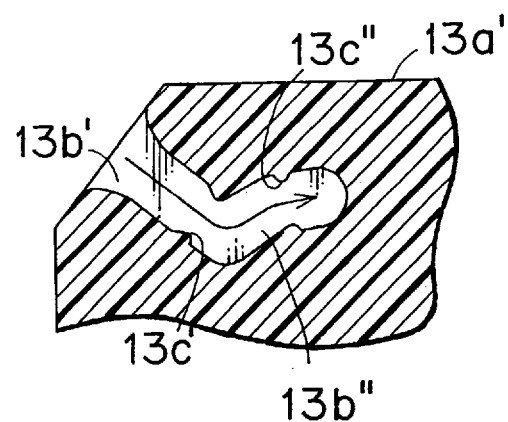

In this shaft-receiving boss, a first shaft-receiving groove 13b'—which inwardly downwardly extends from the inlet of the boss 13a' as in FIGS. 12A and 12B—is extended by a second shaft-receiving groove 13b'' which extends gradually upwardly from the innermost (lowermost) part of the first groove 13b'. Second locking projections 13c'' are also provided in addition to the locking projections (first locking projections) 13c' as mentioned above.

With such shaft-receiving bosses 13a' employed, the mounting of the electric equipment unit 15 is effected as follows.

As shown in FIGS. 15A and 15B, the support shaft projections 28 at the lower end of the electric equipment unit 15 are inserted into the shaft-receiving grooves 13b' so that they ride over the first locking projections 13c' inside the groove to be set in the lowermost part of the groove. In this position, the electric equipment unit 15 is rotatable about the support shaft projections 28. The above is the same as in the preceding example.

The unit 15 is then rotated upwardly so far that the tips of the clamps 24 contact the fixing holes 12, and thereafter a horizontal force is applied to the unit 15, at which the support shaft projections 28 move along the cam shape of the second shaft-receiving grooves 13b''. Concurrently, the inclined resilient contact pieces 20b of the surface contact terminals 20 on top of the unit 15 are respectively brought into sliding contact with the end surfaces of the connection terminals 14b to be connected with the unit-connecting portion 14.

The mounting and connecting of the electric equipment unit 15 is completed when, as shown in FIG. 15C, the clamps 24 are inserted and rigidly fixed in the fixing holes 12 and the support shaft projections 28 advance beyond the second locking projections 13c'' and are locked thereby in the innermost part. The connection terminal 14b of the unit-connecting portion 14 has been shown here as comprising a flat end surface, but this invention is also applicable to the case where a wire and an aligning connector are employed.

Where the upwardly inclined second shaft-receiving groove 13b'' is provided continuous to the downwardly inclined first shaft-receiving groove 13b' as shown in FIG. 14, the electric equipment unit 15 can be mounted in the mount opening 11 with a relatively small force by using slopes of the second shaft-receiving groove 13b''.

In the embodiment shown in FIGS. 9 to 15, by setting the inlet opening of the shaft-receiving grooves 13b' sufficiently large, the insertion therein of the support shaft projections 28 of the support shaft portions 26' and thus the preliminary locking operation of the electric equipment unit 15 are facilitated. Further, depending on their design, the shaft-receiving bosses 13a' can provide a variable support strength for the module 15.

In the structures for mounting the electric equipment unit 15 to the mount opening 11 as shown in FIGS. 1 to 15, the unit 15 is rigidly fixed at four corners, i.e., at upper opposite sides by means of the corresponding clamps 24 and fixing holes 12, and at lower opposite sides by means of the corresponding support shafts 26, 26' and shaft-receiving portions 13, 13'. Therefore, since the instrument panel P is subject to a relatively large change in temperature (−50° to 120° C.), there may possibly arise a positional discrepancy between the unit-connecting portion 14 and the panel-connecting portion 21 due to a difference in expansion and contraction between the mount opening 11 on the panel side and the electric equipment unit 15, which difference results from a difference in their material, causing an unstable electric connection.

Figure 27:
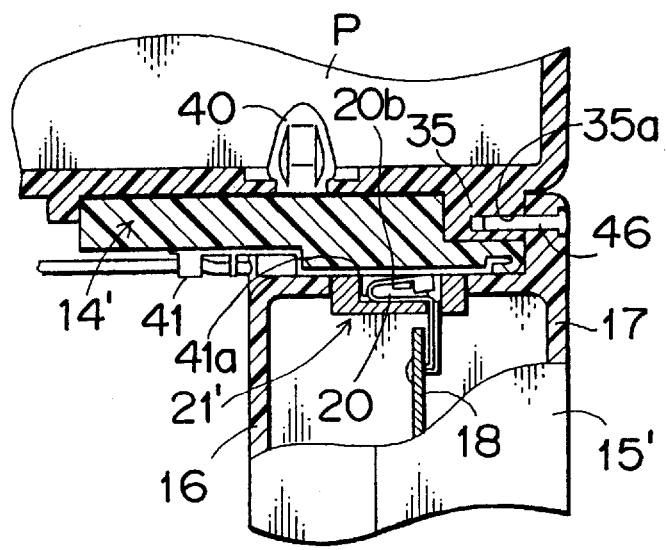
FIG. 27 is a partial sectional view showing the unit of FIG. 16 and the instrument panel in electric connection with each other.
Figure 28:
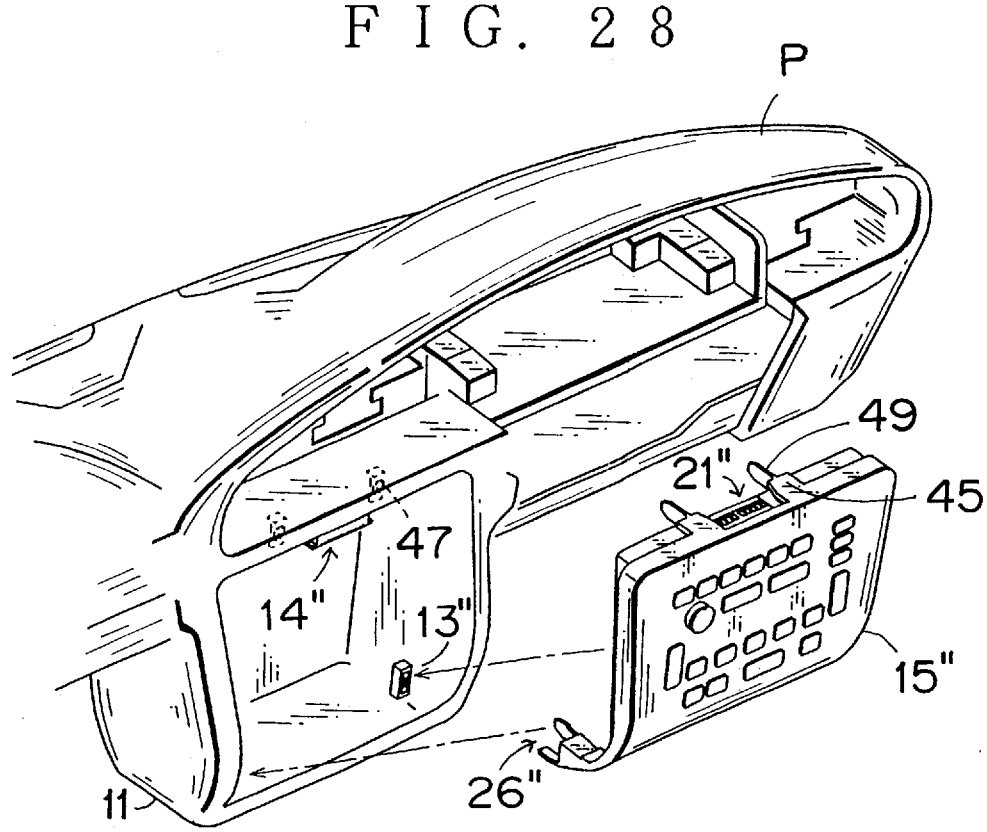
FIG. 28 is a perspective view of a structure for mounting an electric equipment unit to the instrument panel according to a further another embodiment of this invention, with the unit shown separated.
Figure 29:
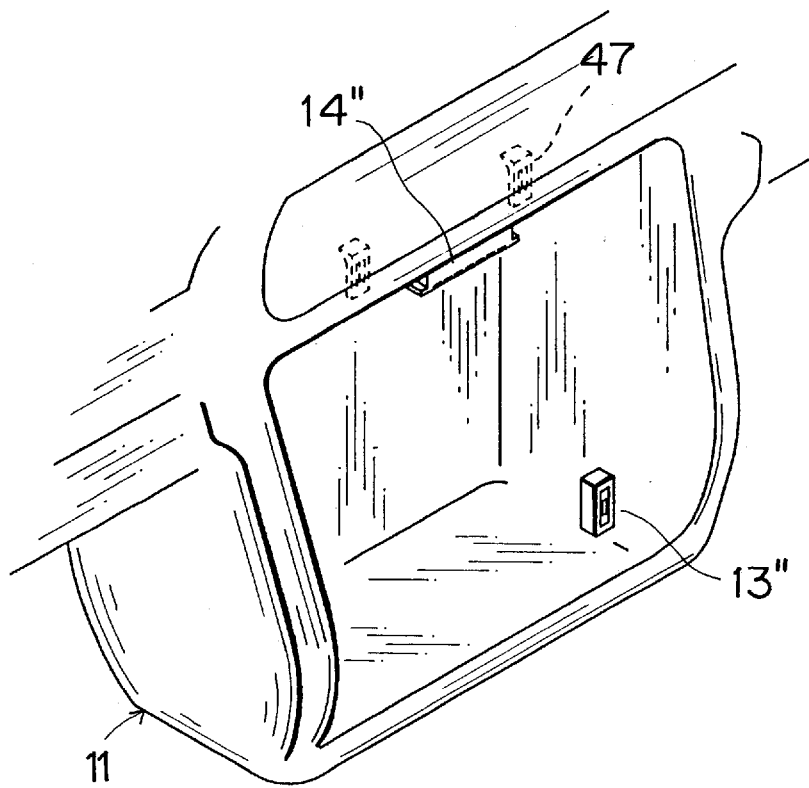
FIG. 29 is an enlarged perspective view of a mount opening of FIG. 28 where the unit is mounted.
Figure 30:
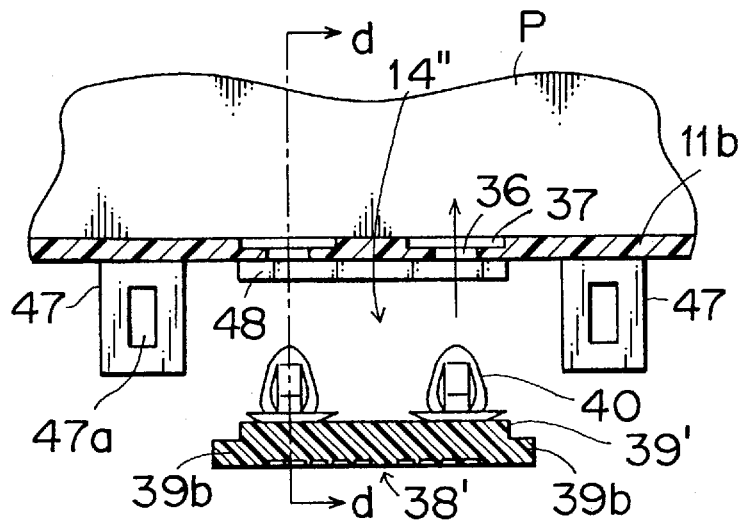
FIG. 30 is a sectional view of a unit-connecting portion of FIG. 28, with its component (connector) shown separated.
Figure 31:
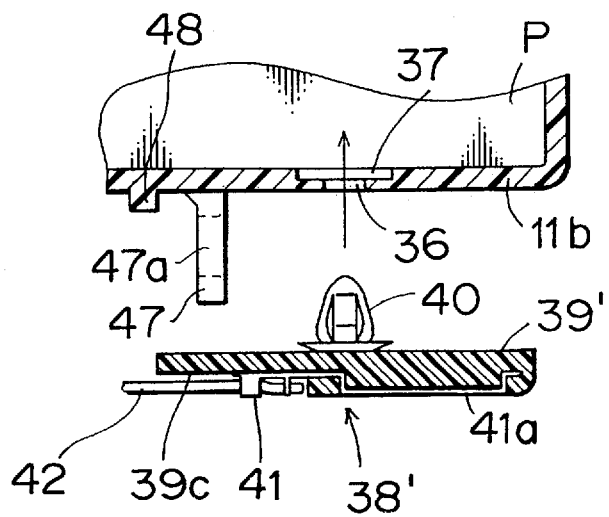
FIG. 31 is a sectional view taken along the line d—d of FIG. 30.
Figure 32:
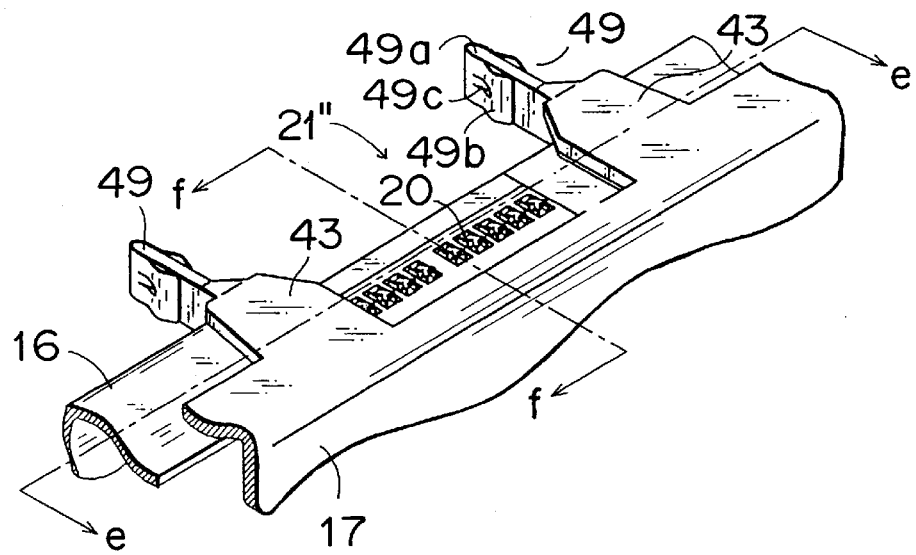
FIG. 32 is a partial enlarged perspective view showing the panel-connecting portion of the unit of FIG. 28.
Figure 33:
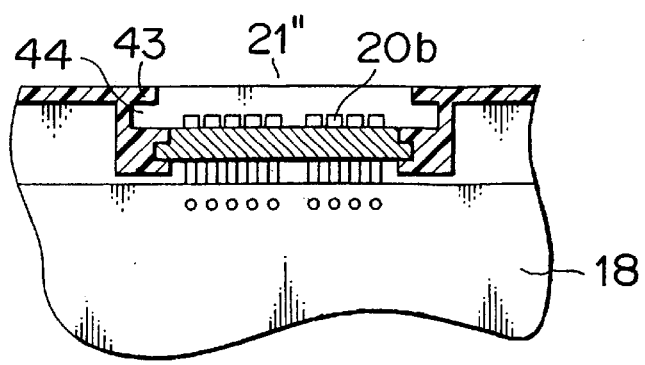
FIG. 33 is a sectional view taken along the line e—e of FIG. 32.
Figure 34:
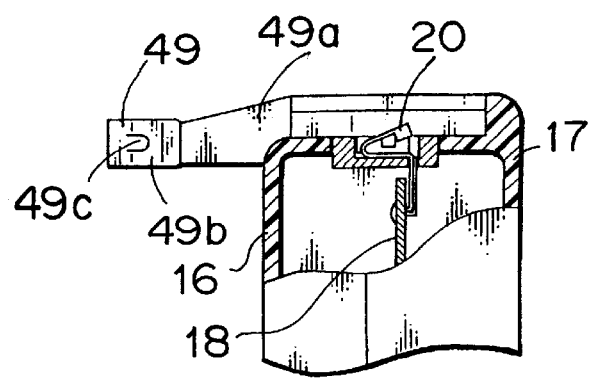
FIG. 34 is a sectional view taken along the line f—f of FIG. 32.
Figure 35:
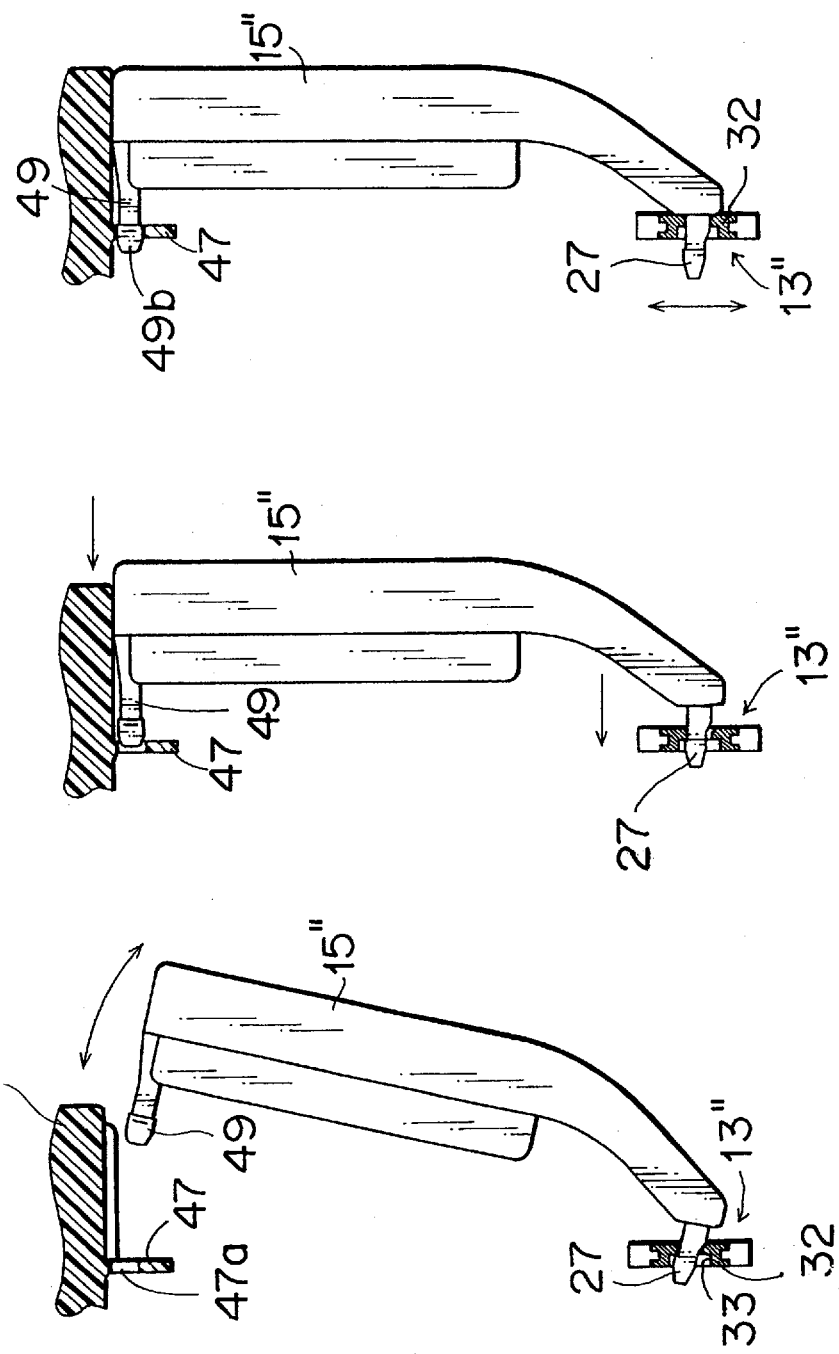
FIGS. 35A to 35C are explanatory views of the process of mounting the electric equipment unit of FIG. 26 to the instrument panel.

The embodiment shown in FIGS. 16 and 27 concerns a structure which realizes an easy unit-mounting, a less influence by the expansion and contraction, and an improved stability in electric connection.

Figure 17:
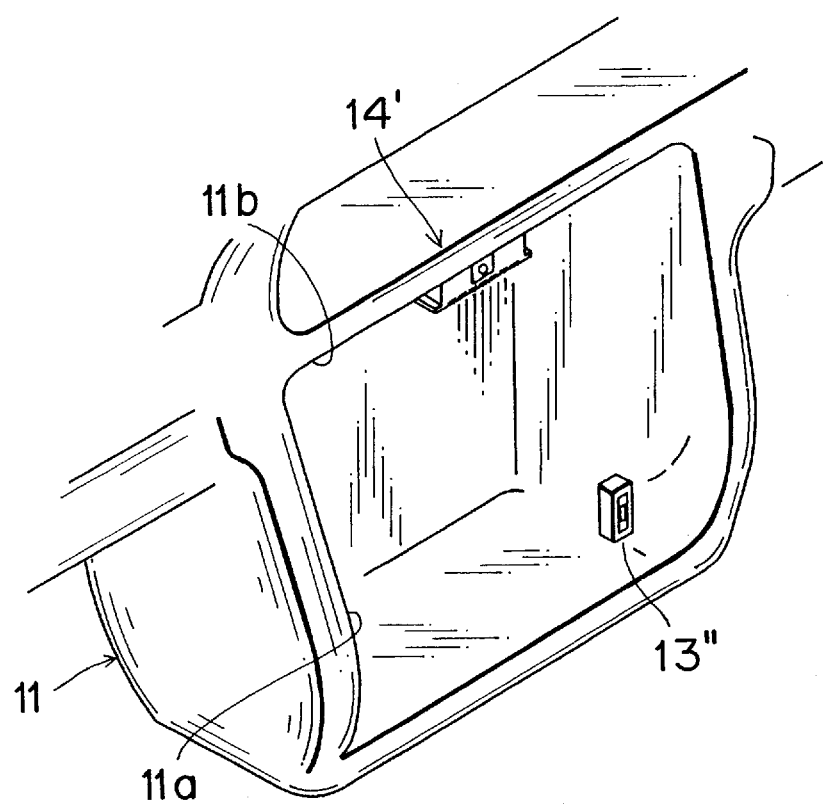
FIG. 17 is an enlarged perspective view of a mount opening in the instrument panel of FIG. 16 where the electric equipment unit is mounted.

As shown in FIGS. 16 and 17, the mount opening 11 of the instrument panel P has shaft-receiving portions 13" on the left and right inner walls 11a at a lower portion thereof, and a unit-connecting portion 14' on the upper inner wall 11b at a center thereof. The electric equipment unit 15' has support shaft portions 26" at its opposite sides at the lower end, and a panel-connecting portion 21' on its top at a center.

Figure 18:
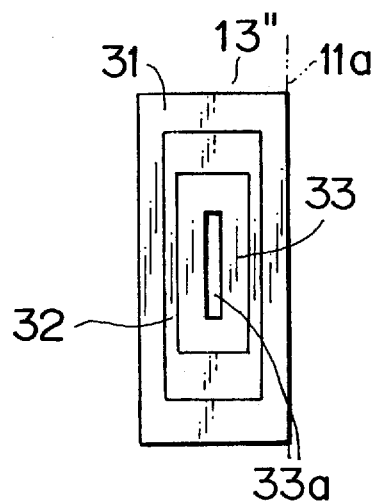
FIG. 18 is an enlarged front view of a shaft-receiving portion of FIG. 17.
Figure 19:
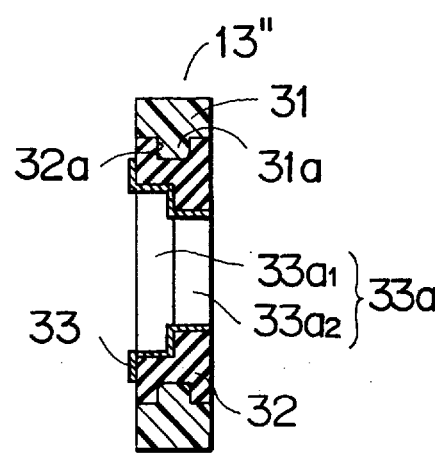
FIG. 19 is a longitudinal sectional view of the shaft-receiving portion of FIG. 18.

Each shaft-receiving portion 13", as shown in FIGS. 18 and 19, comprises a frame body 31 integrally formed on the respective inner wall 11a, a mouthpiece 33 positioned inside the frame body and having a shaft-receiving slit 33a therein, and an elastic member 32 of rubber, polyurethane foam or the like which connects the mouthpiece 33 to the frame body 31. The shaft-receiving slit 33a in the mouthpiece 33 is made up of a front longer insertion guide slit 33a1 and a rear shorter engagement slit 33a2. A fitting groove 32a is provided circumferentially around the outer periphery of the elastic member 32, and an annular rib 31a is provided circumferentially on the inner periphery of the frame body 31, the rib fitting in the groove to hold the mouthpiece 33 in place. With the construction as described above, the mouthpiece 33 and thus the shaft-receiving slit 33a are slightly movable up and down and left and right within the limits of the elasticity of the elastic member 32.

Figure 20:
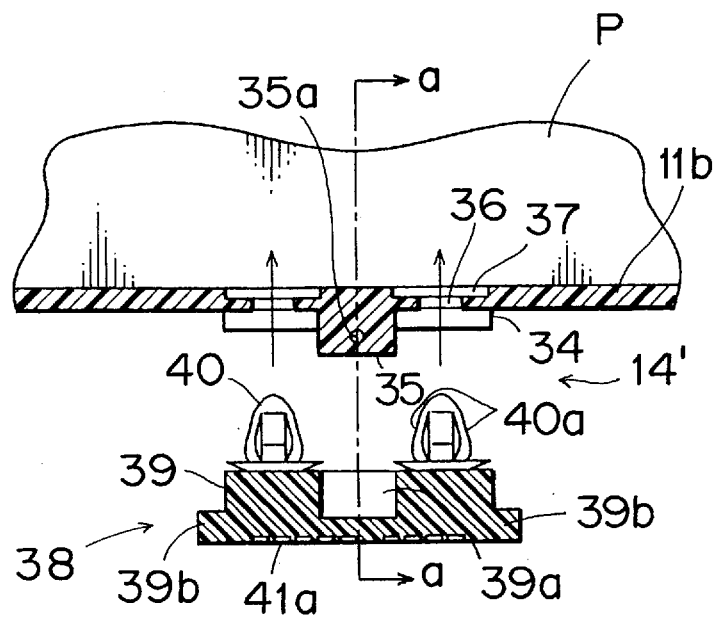
FIG. 20 is a sectional view of a unit-connecting portion of FIG. 17, with its component (connector) shown separated.
Figure 21:
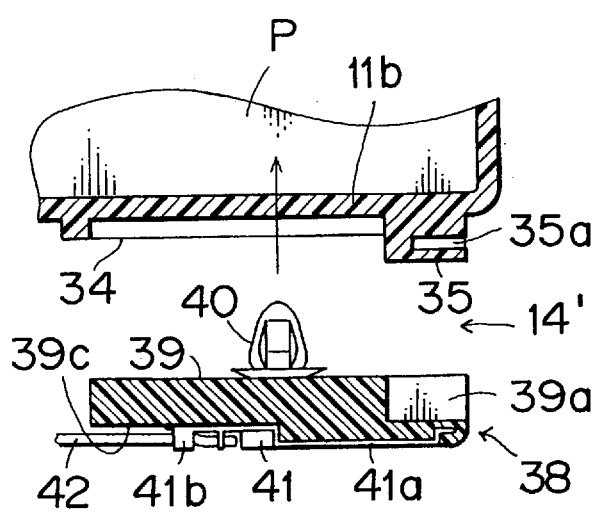
FIG. 21 is a sectional view taken along the line a—a of FIG. 20.

The unit-connecting portion 14', as shown in FIGS. 20 and 21, comprises a connector holder 34 provided on the upper inner wall 11b and a connector 38 fitted therein. The connector holder 34 comprises a rectangular frame body provided on the upper inner wall 11b and a fixing boss 35 protruding downwardly at a center of the front of the frame body, the boss having a screw hole 35a. In the part of the upper inner wall 11b that forms the ceiling of the holder 34, there are provided at opposite left and right sides clip holes 36 and clip seat recesses 37 continuous to and having a larger diameter than the clip holes.

The connector 38 comprises an insulating base plate 39, a pair of laterally opposed clips 40 on top of the base plate, and a plurality of terminals 41 arranged in a row on the underside of the base plate, each including a connection terminal 41a and a wire-connecting portion 41b.

The insulating base plate 39 has on its top at a center of the front a recess 39 for engagement therein of the fixing boss 35 of the connector holder 34, insertion guide projections 39b at opposite left and right sides, and on the underside at a rear half thereof a low stepped portion 39c. The pair of clips 40 each with a lock wing 40a are provided upright on top of this insulating base plate 39, the terminals' wire-connecting portions 41b are disposed in the low stepped portion 39c at the underside rear half, and the terminals' connection terminals 41a are disposed on the underside front half, the wire-connecting portions 41b being connected to wires 42 constituting a wiring harness (not shown).

With the construction as mentioned above, if the connector 38 is pushed upwards with the pair of clips 40, 40 placed in the respective clip holes 36 in the upper inner wall 11b, the fixing boss 35 fits in the recess 39a and the insulating base plate 39 in the connector holder 34, making it possible to easily position and fix the connector 38 in place. When the clips 40 are inserted, the pair of lock wings 40a are pushed through the clip holes 36 to be received in the clip seat recesses 37 with a click, thus providing a good feeling of fitting and a stable seating position.

Figure 22:
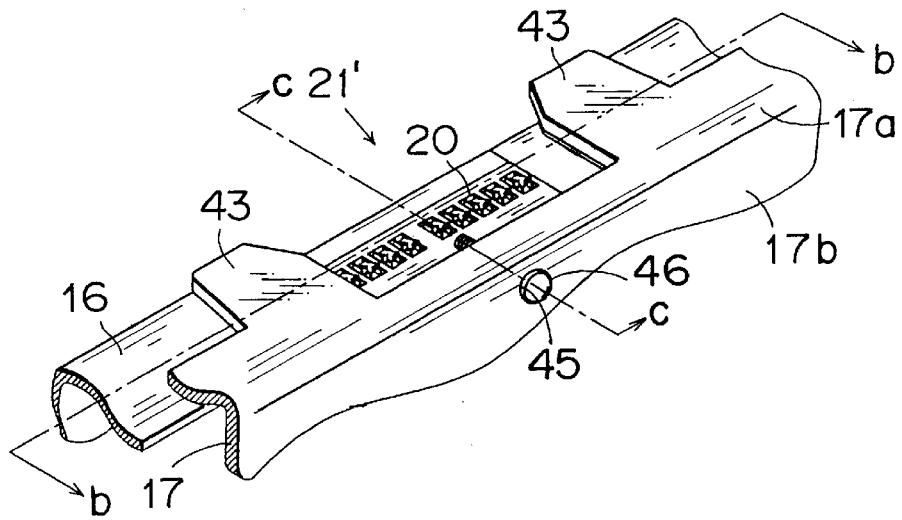
FIG. 22 is a partial enlarged perspective view showing a panel-receiving portion of the electric equipment unit of FIG. 16.
Figure 23:
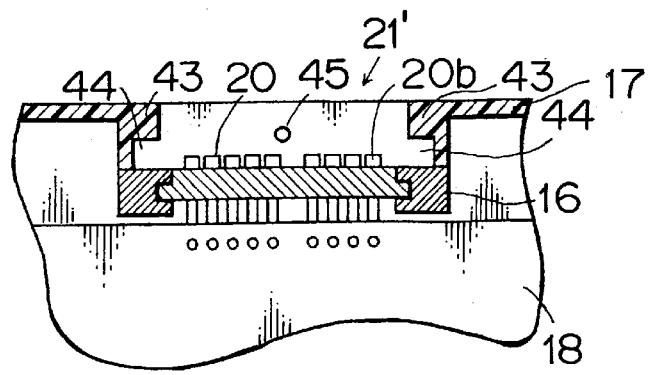
FIG. 23 is a sectional view taken along the line b—b of FIG. 22.
Figure 24:
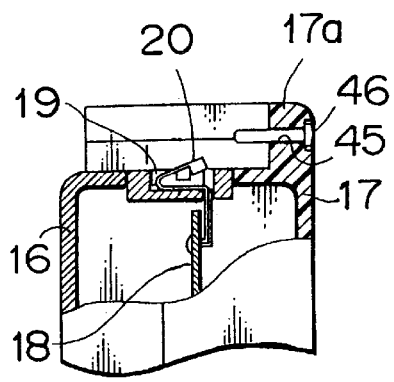
FIG. 24 is a sectional view taken along the line c—c of FIG. 22.

FIG. 22 is a perspective view of the panel-connecting portion 21', FIG. 23 is a sectional view along the line b—b of FIG. 22, and FIG. 24 is a sectional view along the line c—c of FIG. 22.

Figure 4:
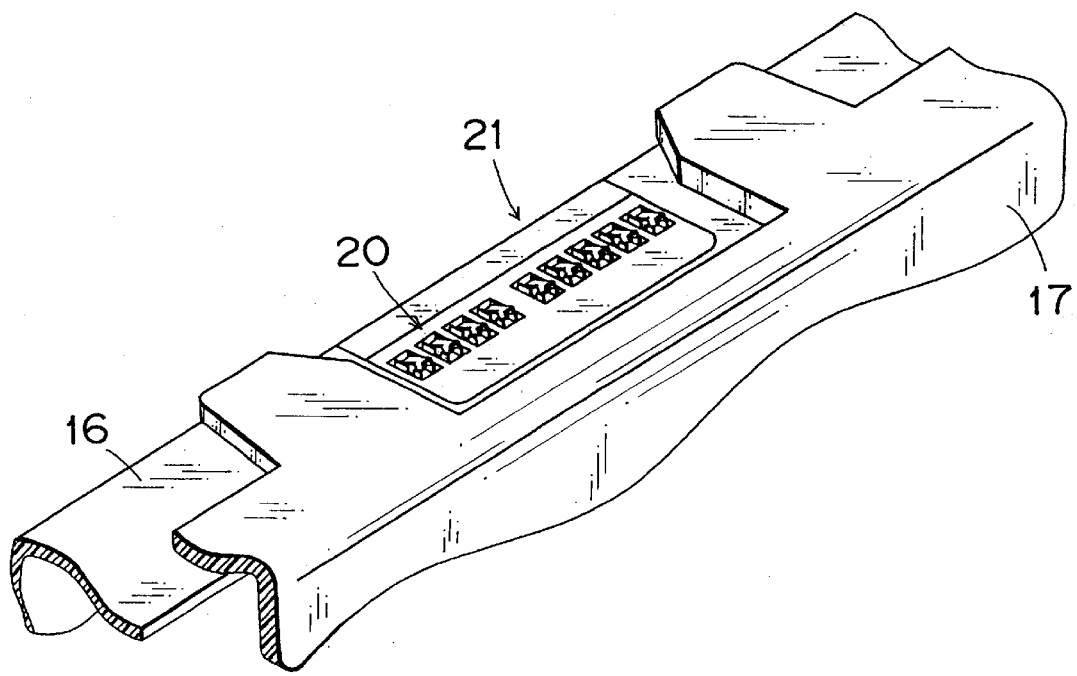
FIG. 4 is a partial perspective view showing a panel-connecting portion of the unit of FIG. 2.

The panel-connecting portion 21' comprises, in addition to a plurality of surface contact terminals 20 arranged in a row in the recess 19 in the rear case 16 as in the embodiment shown in FIG. 4, a pair of insertion guide arms 43, 43 so projecting from the upper wall 17a of the finish panel 17 as to bound both left and right sides of the plurality of surface contact terminals 20, guide grooves 44 between the insertion guide arms 43 and the rear case 16, formed at opposite inner sides of the guide arms 43, and a bolt insertion hole 45 provided through an upper edge portion 17b of the finish panel between the insertion guide arms 43, 43, the bolt insertion hole 45 having preliminarily locked therein by a not-shown stop ring a bolt 46 for the screw hole 35a in the fixing boss 35 of the connector holder 34.

The mounting of the electric equipment unit 15' will now be described with reference to FIGS. 25 to 27.

Figure 26A:
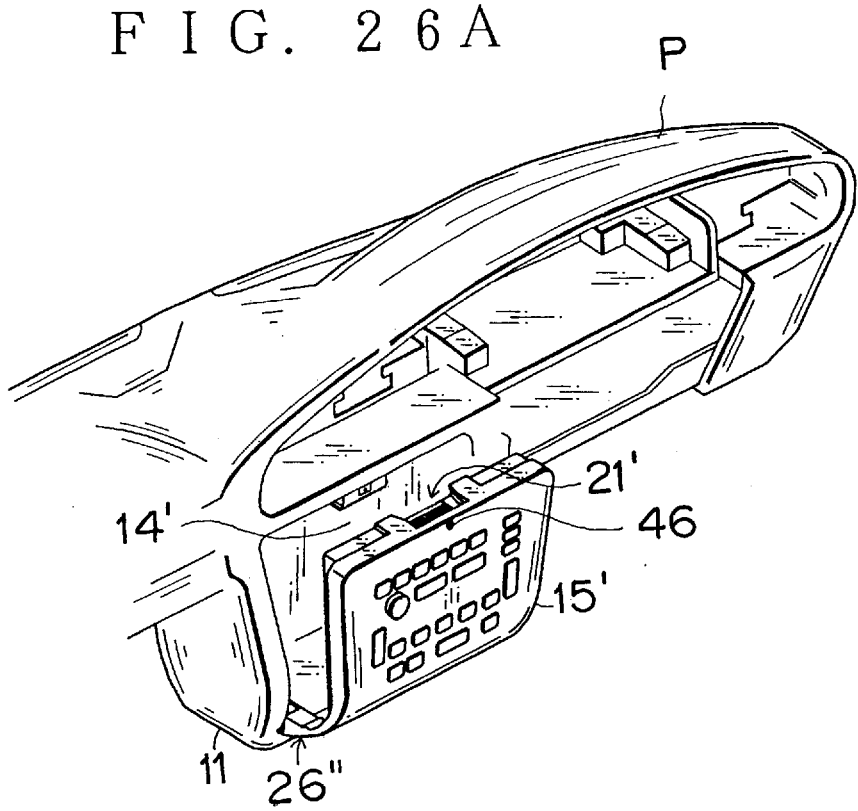
FIGS. 26A and 26B are perspective views of the electric equipment unit of FIG. 16 in the process of being mounted to the instrument panel.

As shown in FIGS. 25A and 26A, the support legs 27 of the support shaft portions 26" are inserted into the shaft-receiving slits 33a in the mouthpieces 33 of the shaft-receiving portions 13", and as in the preceing examples the electric equipment unit 15' is preliminarily locked to the instrument panel P by the engagement of the recesses 27a with edges of the engagement slits 33a2, in an inclined position opened upwardly relative to the instrument panel P. The longer insertion guide slit 33a1 at the front of the shaft-receiving slit 33a in the mouthpiece 33 facilitates the insertion operation of the support leg 27 thereinto.

If the electric equipment unit 15' is then pushed at an upper portion thereof towards the mount opening 11, the unit 15' rotates about the shaft-receiving portions 13" so that, as shown in FIG. 25B, the unit-connecting portion 14' and the panel-connecting portion 21' are opposed substantially in parallel to each other. Thus, the connector 38 advances between the pair of insertion guide arms 43, 43, with the guide projections 39b at opposite left and right sides of its insulating base plate 39 sliding along the guide grooves 44, to bring the front end surface of the connector 38 (fixing boss 35) into abutment with the indented end surface of the upper edge portion 17b of the finish panel 17, at which the unit 15' stops its rotation.

In this state, as shown in FIG. 27, the inclined resilient contact pieces 20b of the surface contact terminals 20 on the side of the panel-connecting portion 21' resiliently contact the respective connection terminals 41a of the terminals 41 on the side of the unit-connecting portion 14' to make electric connection.

Figure 26B:
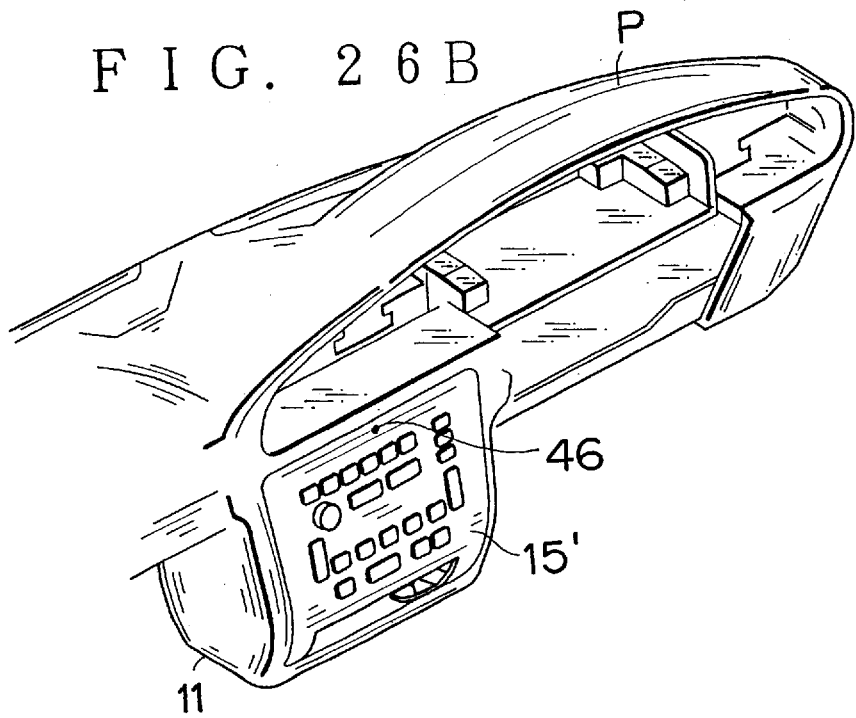

Thereafter, a not-shown tool such as an impact screwdriver is used to thread the bolt 46 into the screw hole 35a of the fixing boss 35 to fix the electric equipment unit 15' to the mount opening 11 as shown in FIGS. 25C and 26B.

Thus, the mounting of the electric equipment unit 15' and the electric connection between the unit-connecting portion 14' and the panel-connecting portion 21' can be easily effected at one time.

When mounted, the unit 15' is at a center of its upper portion rigidly fixed by the bolt 46 threaded into the screw hole 35a of the fixing boss 35, and at opposite sides of its lower portion slightly up and down and left and right movable supported by the support shaft portions 26" engaged in the shaft-receiving portions 13" incorporating the elastic material 32.

Thus, vertical expansion or contraction of the unit 15' due to a change in environmental temperature is absorbed by the elastic material-incorporating shaft-receiving portions 13"

and gives no affections on the electric connections between the unit-connecting portion 14' and the panel-connecting portion 21'.

Further, since horizontal expansion or contraction of the unit 15' takes place on opposite sides of the center-positioned one bolt 46, its affections on the fixation and the electric connections are substantially negligibly small.

FIGS. 28 to 36 show another fixing structure between the unit-connecting portion 14' and the panel-connecting portion 21'.

The unit-connecting portion 14" comprises a pair of brackets 47 depending from opposite sides of a center of the upper inner wall 11b, each having a fixing hole 47a, a downwardly projecting connector stopper 48 provided rearwardly between the brackets 47, 47, a pair of clip holes 36 provided in the upper inner wall 11b as in the preceding example, and a connector 38'. The connector 38' comprises a flat insulating base plate 39' without a recess 39a on its top which corresponds to the fixing boss 35 as in the preceding example, guide projections 39b at its opposite sides, a pair of clips 40, 40 provided upright on its top, and a plurality of terminals 41 arranged in a row on its underside as in the preceding example. To fix the connector 38' to the upper inner wall 11b, the pair of clips 40 are only inserted and engaged in the respective clip holes 36.

The panel-connecting portion 21" of the electric equipment unit 15" has a pair of projecting metal clamps 49 in replacement of the bolt insertion hole 45 as in the preceding example. The clamps 49 are disposed on the undersides of the insertion guide arms 43 and fixed by mold to the finish panel 17. Each clamp 49 comprises a plate-like main body 49a which extends from the finish panel 17 in parallel to and farther than the respective insertion guide arm 43, and resilient tongues 49b on opposite sides of the main body 49a, extending rearwardly from the front end of the main body, the resilient tongues 49b being formed with cut and raised pieces 49c directed to the main body 49a for adjusting the spring force.

Figure 36:
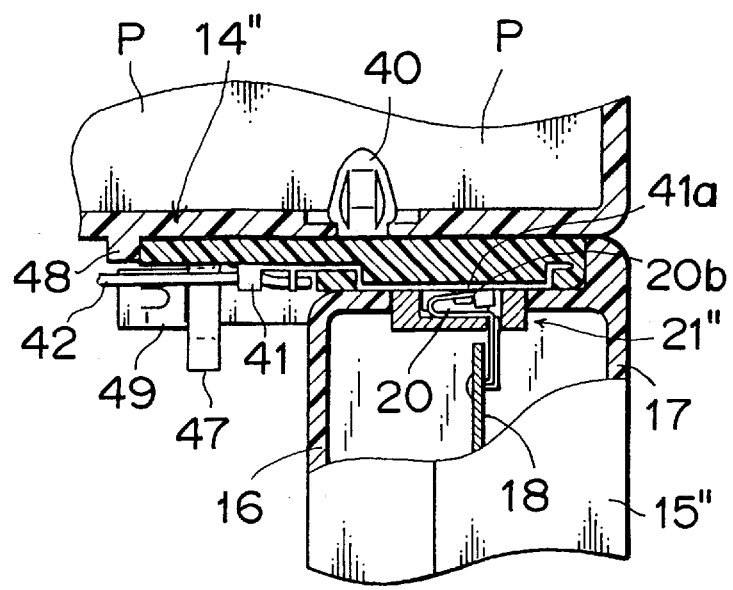
FIG. 36 is a partial sectional view of the unit of FIG. 28 and the instrument panel in electric connection with each other.
Figure 37:
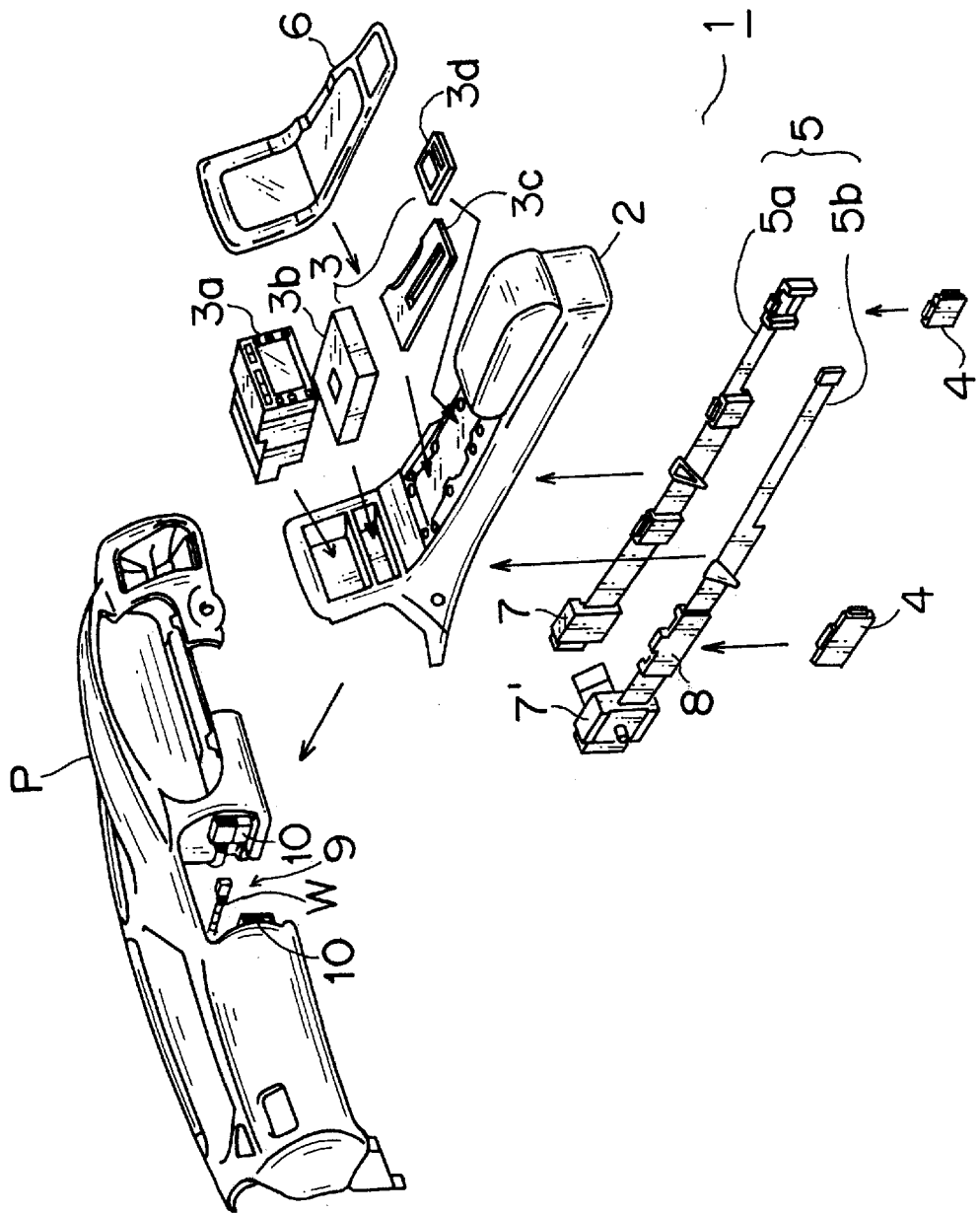
FIG. 37 is an explanatory view of a conventional instrument panel.

FIGS. 35A to 35C show the process of mounting the electric equipment unit 15", and FIG. 36 is a partial sectional view showing the mounted state of the unit 15".

As shown in FIGS. 35A and 35B, the support legs 27 at opposite sides at a lower portion of the electric equipment unit 15" are inserted into the mouthpieces 33 of the shaft-receiving portions 13" to preliminarily lock the unit 15", followed by pushing the unit 15" at an upper portion thereof towards the mount opening 11 as in the preceding example.

When thus pushed, the tips of the pair of clamps 49, 49 on top of the unit 15" at a center thereof advance into the corresponding fixing holes 47a of the brackets 47 and are locked there by the resilient tongues 49b, as shown in FIGS. 35C and 36. The connector stopper 48 on the upper inner wall 11b prevents the unit 15" from being unduly pushed.

With the structure as mentioned above in which the unit 15" is at an upper portion thereof fixed by the clamps 49 engaged in the brackets 47, vertical expansion or contraction of the unit 15" is absorbed by the shaft-receiving portions 13" as in the preceding example and thus gives no affections on electric connections between the unit-connecting portion 14" and the panel-connecting portion 21".

Since horizontal expansion or contraction of the unit 15' takes place on opposite sides of the center-positioned pair of brackets 47, 47 (or clamps 49, 49), its affections on the fixations and the electric connections are very small.

Further, since each clamp 49 is on its opposite sides at the front provided with resilient tongues 49b and locked in the respective fixing hole 47a via these tongues 49b—which are elastically displaceable within the limits of the width dimention of the fixing hole 47a—, the inclined resilient contact pieces 20b of the surface contact terminals 20 are slightly slidable relative to the connection terminals 41a of the terminals 41, resulting in no undue forces applied thereon.

Having now fully described the invention, it will be apparent to one of ordinary skill in the art that many changes and modifications can be made thereto without departing from the spirit and scope of the invention as set forth herein.

What is claimed is:

1. A structure for mounting an electric equipment unit to a mount opening provided in a vehicle instrument panel, comprising:

unit-connecting means and fixing means for said unit, each provided at a respective upper portion inside said mount opening, and shaft-receiving means provided at a lower portion inside said mount opening;

panel-connecting means and fixed means corresponding to said fixing means, each provided at a respective upper portion of said unit, said panel-connecting means being electrically connected to an internal circuit of said unit, and support shaft means provided at a lower portion of said unit, wherein said shaft-receiving means and said support shaft means are engaged with each other such that said unit is rotatably supported at the lower portion, and wherein when said fixing means and said fixed means are engaged with each other, said unit is as a whole fixed to said mount opening while at the same time causing said unit-connecting means and said panel-connecting means to be electrically connected with each other.

2. The structure according to claim 1, wherein said unit comprises a rear case containing a circuit board constituting said internal circuit, and a finish panel fitted thereover, and wherein said panel-connecting means is provided on an upper wall of said rear case.

3. The-structure according to claim 2, wherein said panel-connecting means comprises a surface contact terminal connected at one end to said internal circuit and having at the other end an inclined resilient contact piece raised from said rear case side towards said finish panel.

4. The structure according to claim 2, wherein said panel-connecting means is provided at a central portion of said upper wall of the rear case.

5. The structure according to claim 3, wherein said unit-connecting means is provided on an upper inner wall surface of said mount opening and comprises a connector of a card edge type having a connection terminal for surface-to-surface contact with said inclined resilient contact piece of the surface contact terminal.

6. The structure according to claim 1, wherein said unit support shaft means comprises support legs extending at opposite left and right sides at the lower portion of the unit, each support leg having a recess, and said mount opening shaft-receiving means comprises shaft-receiving holes for receipt therein of said support legs, and wherein edges of said shaft-receiving holes and said recesses of said support legs are engaged with each other to preliminarily lock said unit to said mount opening in an inclined position opened upwardly relative to said mount opening.

7. The structure according to claim 1, wherein said unit support shaft means comprises support legs extending at opposite left and right sides at the lower portion of the unit, each support leg having a recess, and said mount opening shaft-receiving means comprises frame bodies integrally formed on opposite inner wall surfaces of said mount opening, mouthpieces disposed inside said frame bodies, each having a slit for receipt therein of a respective one of said support legs, and elastic members provided circumferentially around said mouthpieces to support the same to said frame bodies, and wherein edges of said slits and said recesses of said support legs are engaged with each other to preliminarily lock said unit to said mount opening in an inclined position opened upwardly relative to said mount opening.

8. The structure according to claim 7, wherein said slits each comprises a front longer slit and a rear shorter slit continuous to each other, the former for guiding insertion therein of said support legs and the latter for engaging said support legs.

9. The structure according to claim 1, wherein said support shaft means comprises support legs extending at opposite left and right sides at the lower portion of said unit, support shaft projections provided on side surfaces of respective said support legs at their front end, and stop pins provided on said side surfaces at a certain distance from said support shaft projections, said projections and said stop pins extending in the same direction perpendicular to respective said support legs, and said shaft-receiving means comprises shaft-receiving bosses each having a shaft-receiving groove for a respective one of said support shaft projections, and wherein when said support shaft projections of said support legs are inserted into said shaft-receiving grooves, said stop pins engage with end surfaces of said shaft-receiving bosses such that said unit is preliminarily locked to said mount opening in an inclined position opened upwardly relative to said mount opening.

10. The structure according to claim 9, wherein said shaft-receiving bosses each further has a locking projection provided on at least one of opposite inner surfaces of a respective one of said shaft-receiving grooves for locking the support shaft projection.

11. The structure according to claim 1, wherein said fixed means of said unit comprises clamps provided at opposite left and right sides at the upper portion thereof, and said fixing means of said mount opening comprises brackets each having a fixing hole for engagement therein of a respective one of said clamps.

12. The structure according to claim 2, wherein said fixed means of said unit comprises a bolt insertion hole provided at a center of an upper edge portion of said finish panel, and said fixing means comprises a fixing boss provided projecting on an upper inner wall of said mount opening, said boss having a screw hole into which a bolt is threaded through said bolt insertion hole.

13. The structure according to claim 2, wherein said fixed means of said unit comprises a pair of clamps so projecting from a central portion of an upper wall of said finish panel as to bound both sides of said panel-connectiong means, and said fixing means comprises brackets depending from an upper inner wall of said mount opening, each having a fixing hole for engagement therein of a respective one of said pair of clamps.

14. The structure according to claim 13, wherein said fixed means of said unit further comprises resilient tongues on opposite sides of each of said clamps through which said each of said clamps engages in the related fixing hole.

15. A method of mounting an electric equipment unit to a mount opening provided in a vehicle instrument panel, which unit has at respective upper portions thereof panel-connecting means electrically connected to an internal circuit of said unit and fixed means, and at a lower portion thereof support shaft means, comprising:

providing at respective upper portions inside said mount opening unit-connecting means and fixing means for said unit, and at a lower portion inside said mount opening shaft-receiving means;

engaging said support shaft means at the lower portion of said unit in said shaft-receiving means of said mount opening to have said unit preliminarily locked to said mount opening in an inclined position opened upwardly relative to said mount opening; and rotating said unit to bring an upper surface thereof into substantially parallel opposition to an upper inner wall surface of said mount opening, and said fixed means into engagement with said fixing means such that said unit is fixed to said mount opening while at the same time said panel-connecting means contacts and is electrically connected with said unit-connecting means.

\* \* \* \* \*